(12) United States Patent
Ghasemzadeh et al.

(10) Patent No.: US 9,820,159 B2
(45) Date of Patent: *Nov. 14, 2017

(54) RADIO RESOURCE MANAGEMENT IN INTER-OPERATOR TIME SHARING OF FREQUENCY SPECTRUM

(71) Applicant: Telefonaktiebolaget L M Ericsson (publ), Stockholm (SE)

(72) Inventors: Farshid Ghasemzadeh, Sollentuna (SE); Muhammad Kazmi, Bromma (SE); Klas Sjerling, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/437,290

(22) PCT Filed: Jun. 3, 2013

(86) PCT No.: PCT/SE2013/050641
§ 371 (c)(1),
(2) Date: Apr. 21, 2015

(87) PCT Pub. No.: WO2014/070066
PCT Pub. Date: May 8, 2014

(65) Prior Publication Data
US 2015/0289141 A1    Oct. 8, 2015

Related U.S. Application Data

(60) Provisional application No. 61/719,606, filed on Oct. 29, 2012, provisional application No. 61/719,619, filed on Oct. 29, 2012.

(30) Foreign Application Priority Data

May 30, 2013  (WO) .............. PCT/SE2013/050626

(51) Int. Cl.
*G01R 31/08*  (2006.01)
*H04W 16/14*  (2009.01)
*H04W 72/04*  (2009.01)

(52) U.S. Cl.
CPC ......... *H04W 16/14* (2013.01); *H04W 72/044* (2013.01); *H04W 72/0446* (2013.01); *H04W 72/0406* (2013.01)

(58) Field of Classification Search
CPC ........................... H04W 72/082; H04W 24/10
(Continued)

(56) References Cited

U.S. PATENT DOCUMENTS

2004/0165547 A1*  8/2004  Lopes ............... H04W 16/00
                                                              370/328
2007/0253466 A1   11/2007  Jones et al.
(Continued)

FOREIGN PATENT DOCUMENTS

EP    1037484 A1   9/2000
EP    1220557 A1   7/2002
(Continued)

OTHER PUBLICATIONS

Middleton, G., et al., "Inter-Operator Spectrum Sharing in a Broadband Cellular Network", 2006 IEEE International Symposium on Spread Spectrum Techniques and Applications, Aug. 28, 2006, pp. 376-380, IEEE.
(Continued)

*Primary Examiner* — Iqbal Zaidi
(74) *Attorney, Agent, or Firm* — Coats & Bennett, PLLC

(57) ABSTRACT

Disclosed are methods as well as wireless devices and radio network nodes for radio resource management (RRM) in inter-operator time-sharing of a frequency spectrum Fs. In one example embodiment, the same frequency spectrum Fs is allocated to each of a plurality of operators during
(Continued)

different time periods such that the same frequency spectrum is shared among all of the plurality of operators.

32 Claims, 9 Drawing Sheets

(58) Field of Classification Search
USPC .................................................. 370/252–312
See application file for complete search history.

(56) References Cited

U.S. PATENT DOCUMENTS

| | | |
|---|---|---|
| 2011/0205941 A1 | 8/2011 | Stanforth |
| 2012/0082100 A1 | 4/2012 | Ahmadi |
| 2013/0201847 A1* | 8/2013 | Chincholi ............. H04W 28/08 370/252 |
| 2013/0279376 A1* | 10/2013 | Ahmadi ................ H04W 16/14 370/277 |

FOREIGN PATENT DOCUMENTS

| | | |
|---|---|---|
| EP | 1853077 A1 | 11/2007 |
| GB | 2491754 A | 12/2012 |
| WO | 2010145779 A1 | 12/2010 |
| WO | 2011111329 A1 | 9/2011 |
| WO | 2014070065 A1 | 5/2014 |

OTHER PUBLICATIONS

Jorswieck, E., et al., "Resource Sharing Improves the Network Efficiency for Network Operators", White Paper, Jul. 4, 2012, pp. 1-55, European research project SAPHYRE.

Fahldieck, T., et al., "Resource sharing between operators—White Paper." Jul. 4, 2012. 55 pages. XPO55270497. SAPHYRE Consortium, Dresden, Germany.

* cited by examiner

RADIO RESOURCE MANAGEMENT IN INTER-OPERATOR TIME SHARING OF FREQUENCY SPECTRUM

TECHNICAL FIELD

The subject matter described herein generally relates to wireless communications networks. In particular, the subject matter relates to methods, apparatuses, and/or systems for radio resource management in inter-operator time sharing of frequency spectrum.

BACKGROUND

This section is intended to provide a background to the various embodiments of the technology that are described in this disclosure. The description herein may include concepts that could be pursued, but are not necessarily ones that have been previously conceived or pursued. Therefore, unless otherwise indicated herein, what is described in this background section is not prior art to the description and/or claims of this disclosure and is not admitted to be prior art by the mere inclusion in this section.

In a synchronized TDD system, adjacent carrier frequencies or carriers close to each other in the frequency domain are frame synchronized (i.e., have same or almost the same frame start timings) and use the same TDD configuration (i.e., same UL/DL/special subframe configuration). In an unsynchronized TDD system, adjacent carrier frequencies or carriers close to each other in the frequency domain can use different TDD configuration and/or can have any frame start timings. For ease of reference, "adjacent carriers" will be used herein to refer to adjacent carrier frequencies and/or carriers close to each other in the frequency domain.

Adjacent carriers may belong to different operators. To mitigate interfering with each other, operators may choose to synchronize their TDD operations. This means that the operators must generally agree on the TDD configuration to be used on the adjacent carriers. One disadvantage of the synchronized TDD is that the operators may be prevented from choosing a TDD configuration that may be more suitable to each operator's traffic demand.

Operators can choose to operate using unsynchronized TDD so that each operator can choose its own TDD configuration on its carrier. This means that the frames of the adjacent carriers can be misaligned and the TDD configuration can be different. This can lead to significant interference issues. BS-to-BS (base station to base station) interference can thus be of particular concern.

To mitigate such interference issues in unsynchronized TDD, a sufficient guard band (e.g., 5 MHz) is generally required between the unsynchronized carriers. This leads to a waste of spectrum which could otherwise be used to carry traffic. This can also lead to requiring a vendor to implement operator specific RF components (e.g., RF filters, power amplifiers, etc) for each unsynchronized carrier frequency.

In some countries, regulators are also assigning the unused spectrum (e.g., guard bands) for some other operation or technology including non-cellular technologies. These auxiliary operations may lead to further challenges with respect to coexistence issues. A particular problem is observed in some countries where regulators do not adopt common allocation of spectrum, sizes of guard bands, and/or restricted blocks.

Restricted blocks are used in Europe where such frequency blocks are highly restricted in the allowed level of operational power or unwanted emissions. This may further accentuate the need for BS equipment that is capable of meeting radio related regulatory requirements under the constraint of different allocation and different level of inter-operator guard band and/or restricted block. Customized solutions to address particular challenges in different regions may in turn increase the cost, effort and complexity of the equipment, apart from the wastage of the spectrum in form of guard band/restricted blocks.

A frequency band or an operating frequency band supports a specific duplex mode of operation. The possible duplex modes are:
  FDD—frequency division duplex:
    Used in e.g., UTRAN FDD and E-UTRAN FDD;
    UL (uplink) and DL (downlink) transmissions take place on different paired carrier frequency channels;
    UL and DL transmissions can occur simultaneously in time;
  TDD—time division duplex:
    Used in e.g., UTRAN TDD and E-UTRAN TDD;
    UL and DL transmissions take place on same carrier frequency channel in different time slots or subframes;
  HD-FDD—half duplex FDD (can be regarded as a hybrid scheme):
    Used in e.g., GSM, GPRS, GERAN, EDGE;
    Like FDD mode, UL and DL transmissions take place on different paired carrier frequency channels;
    Unlike FDD mode, UL and DL transmissions do not occur simultaneously in time;
    Like TDD mode, UL and DL transmissions can take place in different time slots or subframes.

There is also another special case of FDD band called "downlink FDD band" (aka DL FDD only band). A well known example is that of LTE (Long Term Evolution) DL FDD band (717-728 MHz), which is being standardized. It does not have UL part of the spectrum. Therefore, for UL transmission the DL FDD band is always used in carrier aggregation mode with another FDD or TDD band such as LTE FDD band 2.

LTE (Long Term Evolution) operates in different duplex modes including FDD, TDD and half duplex FDD. LTE TDD uses unpaired spectrum, which is similar to other TDD systems such as UTRA TDD and TD-SDMA. In LTE, DL and UL transmission are based on radio frames of 10 ms duration. There are two radio frame structures—type 1 for FDD and type 2 for TDD. Type 2 frame structure is applicable to LTE TDD system [see e.g. reference 1 ], and is illustrated in FIG. 1, which illustrates the time domain radio frame structure.

Each 10 ms radio frame consists of two 5 ms half-frames, and each half-frame consists of five 1 ms subframes. Each subframe is one of a DL subframe, a UL subframe or a special subframe (or simply S subframe). Each subframe can be further subdivided. As seen, each UL and DL subframe is divided into two slots, each of 0.5 ms duration. The S subframe is divided into fields DwPTS (downlink pilot time slot), GP (guard period), and UpPTS (uplink pilot time slot). The sum durations of DwPTS, GP, and UpPTS is equal to 1 ms. Different combinations of DL, UL, and S subframes give rise to different TDD configurations.

The supported UL-DL configurations in LTE TDD are listed in Table 1, where for each subframe of the radio frame, "D" denotes that the subframe is reserved for DL transmissions, "U" denotes that the subframe is reserved for UL transmissions and "S" denotes a special subframe. As seen, UL-DL configurations with both 5 ms and 10 ms DL-to-UL switch-point periodicity are supported. In case of 5 ms periodicity, the S subframe exists in both half-frames. In case of 10 ms periodicity, the S subframe exists in the first half-frame only.

TABLE 1

LTE TDD UL-DL configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Regarding the S subframe, the durations of DwPTS and UpPTS are given in Table 2, and are subject to a condition that the total duration of DwPTS, GP and UpPTS is equal to 1 ms.

TABLE 2

LTE TDD special subframe configuration (lengths of DwPTs/GP/UpPTS)

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | | | 7680·$T_s$ | | |
| 1 | 19760·$T_s$ | | | 20480·$T_s$ | 2192·$T_s$ | 2560·$T_s$ |
| 2 | 21952·$T_s$ | 2192·$T_s$ | 2560·$T_s$ | 23040·$T_s$ | | |
| 3 | 24144·$T_s$ | | | 25600·$T_s$ | | |
| 4 | 26336·$T_s$ | | | 7680·$T_s$ | | |
| 5 | 6592·$T_s$ | | | 20480·$T_s$ | 4384·$T_s$ | 5120·$T_s$ |
| 6 | 19760·$T_s$ | 4384·$T_s$ | 5120·$T_s$ | 23040·$T_s$ | | |
| 7 | 21952·$T_s$ | | | — | | |
| 8 | 24144·$T_s$ | | | — | | |

Subframes 0 and 5 and DwPTS are always reserved for DL transmissions. UpPTS and the subframe immediately following the S subframe is always reserved for UL transmission. This means subframe 2 is always reserved for UL. For the 5 ms periodicity, subframe 7 is also reserved for UL. Subframes 3, 4, 8, 9, may be reserved for either UL or DL. For 10 ms DL-to-UL switch point periodicity, subframe 7 may also be reserved for either UL or DL.

In a TDD cell, the TDD configuration is characterized by UL-DL-S subframe configuration. In this disclosure, the term "TDD configuration" used hereinafter refers to a combination of UL-DL configuration (e.g., one of in Table 1) and S subframe configuration (e.g., one of in Table 2) configured in the TDD cell.

The subject matter is not limited to the configurations listed in Tables 1 and 2. Also, the subject matter is not limited to TDD configuration—one or more aspects are applicable to other configurations including FDD, HD-FDD, DL FDD band, among others.

In TDD mode, the radio transceiver in the UE and in the radio node (e.g., base station) switches between the receiver and the transmitter for receiving and transmitting the radio signals. The change in the direction from DL to UL and vice versa is commonly called as RX/TX (or TX/RX) switching.

The requirements related to the TX (transmitter)/RX (receiver) switching are predefined for both UE and BS. For LTE base station, the 3GPP specification TS 36.104 [i.e. reference 7] indicates that the durations of DL and UL transient periods are 17 μs. The transient periods define time periods during which the DL and UL subframes change states from the OFF to ON periods and vice versa [see for example reference 7]. The DL/UL/DL transient period for the LTE TDD base station is illustrated in FIG. 2. In practice, the transceivers are likely to transient periods shorter than 17 μs for both transitions from OFF to ON and from ON to OFF.

New frequency bands for different technologies are being standardized with an ever increasing pace. Various internal and regional regulatory organizations and standardization bodies are also expending considerable effort in introducing these bands to be widely used to facilitate roaming, to simplify device implementation, and to reduce costs. Due to the increasing demand for mobile services coupled with scarcity of spectrum (e.g., scarcity of spectrum below 1 GHz range is a particular concern) efficient use of the available spectrum is becoming particularly important.

Standard bodies such as 3GPP are specifying frequency bands and associated aspects including frequency band number (aka band indicator), channel arrangement, signaling and requirements for different bands. These standardized principles and requirements can potentially be used in different countries or regions. They enable the mobile terminal and network manufacturers to build products according to the need and market demands in different parts of the world.

TABLE 3

E-UTRA operating bands

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| . . . | | | |
| 33 | 1900 MHz-1920 MHz | 1900 MHz-1920 MHz | TDD |
| 34 | 2010 MHz-2025 MHz | 2010 MHz-2025 MHz | TDD |

TABLE 3-continued

E-UTRA operating bands

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

NOTE 1:
Band 6 is not applicable

In 3GPP, several frequency bands have been specified for different technologies: GSM/GERAN [see e.g. reference 8], UTRAN FDD [see e.g. references 2-3], UTRAN TDD [see e.g. references 4-5], LTE FDD (E-UTRAN FDD) [see e.g. references 6-7] and LTE TDD (E-UTRAN TDD) [see e.g. references 6-7]. The currently standardized LTE FDD and TDD frequency bands are shown in Table 3.

Carrier frequencies in a frequency band are enumerated. The enumeration is generally standardized such that a particular combination of a frequency band and carrier frequency can be determined by a unique number called absolute radio frequency number. In GSM/GERAN, UTRAN and E-UTRAN, the channel numbers are respectively referred to as ARFCN (Absolute Radio Frequency Channel Number), UARFCN and EARFCN.

In FDD systems, separate channel numbers are specified for UL and DL. In TDD there is only one channel number since the same carrier is used in both directions.

The channel number for each band is sufficiently unique to enable different bands to be distinguished. The channel number for a band can be derived from expressions and mapping tables defined in the relevant specifications for each technology. Based on the signaled channel number (e.g., EARFCN) and predefined parameters associated with each band, the UE can determine the actual carrier frequency and the corresponding frequency band. For example the relation between the EARFCN and a DL carrier frequency $F_{DL}$ in MHz (megahertz) is predefined in LTE by the following equation in [see e.g. references 6-7]:

$$F_{DL}=F_{DL\_low}+0.1(N_{DL}-N_{Offs-DL}) \quad (1)$$

where $F_{DL\_row}$ (base DL carrier frequency in MHz) and $N_{offs-DL}$ (base channel number) are predefined values in references 3-4, respectively, for each band, and $N_{DL}$ is the DL EARFCN (DL channel number).

As an illustration, consider the E-UTRA band 5, whose EARFCN $N_{DL}$ as predefined in references 6-7, respectively, lies between 2400-2649. The predefined values of $F_{DL\_low}$ and $N_{off-DL}$ are 869 and 2400 respectively. Assume that the network signals $N_{DL}$=2500 as the DL channel number. Using the above equation (1), the UE can determine that the DL carrier frequency $F_{DL}$ of the channel is 879 MHz. As indicated above, the predefined EARFNC range is unique for each band. Hence, the UE can determine the frequency band corresponding to the signaled EARFNC. An expression to derive the E-UTRA FDD UL carrier frequency, which is similar to that of the DL carrier frequency, is also predefined.

In E-UTRA FDD, both fixed transmit-receive frequency separation (e.g., fixed duplex) and variable transmit-receive frequency separation (variable duplex) are supported. If a network uses fixed duplex for a DL carrier, then the network only needs to signal the channel number corresponding to the band, i.e., only the DL EARFCN needs to be signaled, since the UE can determine the UL carrier from the DL carrier (from equation (1)) and the predefined duplex gaps in references 6-7. On the other hand, if the network uses variable duplex, it should signal both DL and UL channel numbers, i.e., signal both DL and UL EARFCNs to the UE.

The frequency bands specified in 3GPP or in other standardization organizations may allow cellular manufacturers to build terminal and network products. However, it is generally up to the regional or even country wide regulatory or any relevant authority to decide whether a certain frequency band is allowed or not in their jurisdiction.

Generally, a particular frequency band or spectrum is split into multiple chunks, and in turn the multiple chunks are assigned to multiple operators in a country, region, province, etc by the relevant frequency allocation authority, or similar. A band may also be operator specific in which case it is entirely owned by one operator. An operator specific band is more common when the pass band (i.e., available spectrum) is small or comparable to channel bandwidth or typically channel bandwidth of a technology. But in most cases, a band is divided among multiple operators. An example allocation of a TDD frequency band to different operators is illustrated FIG. 3A.

But as shown in FIG. 3B, a practical deployment comprising of unsynchronized TDD carriers belonging to different operators generally requires a guard band and/or restricted block (e.g., 5 MHz) between at least adjacent carriers to mitigate interference issues. For purposes of this disclosure, the expressions guard band and restricted block may be used interchangeably unless explicitly indicated otherwise. Generally, transmissions on the guard band are not allowed or allowed only under severe restrictions such as transmission with very low power. For the purposes of this document, it may be assumed that little to no meaningful transmission occurs on the guard bands.

In an unsynchronized TDD system, different carriers have arbitrary frame start timings and/or different TDD configurations. Note that FDD frequency band can also be divided among operators as shown in FIG. 4.

Since a band of frequency can generally be used for more than one technology, the band can potentially be also split for different technologies, and the split can vary from one region to another. For instance, the UTRAN FDD band 1 and E-UTRAN FDD band 1 are generally considered to be relatively universal as they are widely available and allocated in a relatively large number of countries across the globe. But they can also be shared among different technologies, and the actual split across technologies can vary.

In USA, the Federal Communications Commissions (FCC) is responsible for attributing licenses for various Wireless Communications Service (WCS) including fixed, mobile, radiolocation or satellite services. Similarly in Europe, the Electronic Communications Committee (ECC), which is part of the European conference of postal and telecommunications administrations (CEPT), is responsible for radio communications. More specifically European Radiocommunications Office (ERO) supports ECC in developing and maintaining the frequency allocation for CEPT member countries. As of today, there are 48 CEPT member countries. Ultimately, each member country has its own frequency allocation. However, the ERO allocation table is used as the basis for developing national frequency allocation. Similar regional organizations are active in other parts of the world for allocating frequencies in their region for different technologies to different operators.

In summary, the actual frequency bands used in a particular region or a country are generally regulated by regional or country wide organizations responsible for frequency allocation in their respective regions.

Multi-Carrier or Carrier Aggregation

It is generally known that in order to enhance peak rates within a technology, multi-carrier or carrier aggregation (CA) can be used. For example, it is possible to use multiple 5 MHz carriers in HSPA (High Speed Packet Access) to enhance the peak rate within the HSPA network. Similarly in LTE, multiple 20 MHz carriers or even smaller carriers (e.g., 5 MHz) can be aggregated in the UL and/or in the DL. Each carrier in the multi-carrier or carrier aggregation system is generally termed as a component carrier (CC) and is also sometimes referred to a cell. A component carrier (CC) may be viewed as an individual carrier in a multi-carrier system.

The term carrier aggregation can be interchangeably called "multi-carrier system", "multi-cell operation", "multi-carrier operation", "multi-carrier transmission" and/or "multi-carrier reception". CA can be used for transmission of signaling and data in the UL and/or the DL directions.

One CC of the CA is the primary component carrier (PCC) and may also be referred to as the primary carrier or anchor carrier. Each of the remaining CCs is a secondary component carrier (SCC), and may also be referred to as a secondary carrier or supplementary carrier. Generally, the PCC carries the essential UE specific signaling and exists in both UL and DL directions in CA. In case there is single UL CC, the UE specific signaling is on that CC. The network may assign different primary carriers to different UEs operating in the same sector or cell.

Therefore, a UE can have more than one serving cell in DL and/or in the UL: one primary serving cell operating on the PCC and one or more secondary serving cells operating on one or more SCCs. The primary serving cell (PSC) can be interchangeably referred to as the primary cell (PCell). Similarly, each secondary serving cell (SSC) can be interchangeably referred to as the secondary cell (SCell). Regardless of the terminology, the PCell and SCell(s) enable the UE to receive and/or transmit data. More specifically, the PCell and SCell exist in DL and UL for the reception and transmission of data by the UE. The remaining non-serving cells on the PCC and SCC are called neighbor cells.

The CCs belonging to the CA may belong to the same frequency band (intra band CA), to different frequency bands (inter-band CA), or any combination thereof (e.g., 2 CCs in band A and 1 CC in band B). An inter-band CA that includes carriers distributed over two bands is also called as dual-band-dual-carrier-HSDPA (DB-DC-HSDPA) in HSPA or inter-band CA in LTE. The CCs of an intra-band CA may be adjacent (intra-band adjacent CA) or non-adjacent (intra-band non-adjacent CA) in the frequency domain. A hybrid CA that includes any combination of intra-band adjacent, intra-band non-adjacent and inter-band CCs is also possible.

Using carrier aggregation between carriers of different technologies is possible. For example, the carriers from WCDMA and LTE may be aggregated. Another example is the aggregation of LTE and CDMA2000 carriers. Such carrier aggregation can be interchangeably referred to as "multi-RAT carrier aggregation", "multi-RAT-multi-carrier system" or simply "inter-RAT carrier aggregation". For the sake of clarity, carrier aggregation within the same technology as described can be regarded as "intra-RAT" or "single RAT" carrier aggregation.

The multi-carrier operation may also be used in conjunction with multi-antenna transmission such as MIMO (multiple-input-multiple-output). For example, signals on each CC may be transmitted by the eNB to the UE over two or more antennas.

The CCs in CA may or may not be co-located at the same site or base station or radio network node (e.g., relay node, mobile relay node, etc). For instance the CCs may originate (i.e., transmitted/received) at different locations (e.g., from non-co-located BS or from BS and RRH or RRU). Examples of combined CA and multi-point communication are DAS, radio remote head (RRH), radio remote unit (RRU), coordinated multipoint transmission and reception (CoMP), and the like. The subject matter described later in this disclosure is applicable to multi-point carrier aggregation systems, i.e., is applicable to each CC in CA or in CA combination with CoMP, and so on.

Random Access (RA)

Random access procedure in LTE enables a UE to gain UL access at least under the following scenarios:
  During an initial access in idle mode;
  To access a target cell during cell change:
    During a handover;
    For a RRC (radio resource control) connection re-establishment such as after radio link failure, and handover failure among others;
    For RRC connection release with redirection;
  After the UE has lost the UL synchronization;
  Due to data arrival when the UE in a connected mode does not retain UL synchronization such as in a long DRX (discontinuous reception);
  To facilitate positioning measurements such as an eNB Rx-Tx time difference measurement, which in turn is used for deriving a timing advance;
  To access a SCell (secondary cell) when the UE is configured with at least one SCell.

The random access procedure can be either contention based or non-contention based. In contention based RA:
  The UE randomly selects a 'random access preamble' during a RACH (random access channel) opportunity to the eNB;
  The network responds to the UE with at least a RA preamble identifier and an initial UL grant in a RAR (random access response) message;
  The UE uses the initial allocation received in the RAR to transmit further details related to the connection in a message 3 (msg3). The UE also sends its identifier in the message 3;
  The eNB echoes the UE identifier in a CRM (contention resolution message).

The contention resolution is considered successful if the UE detects its own identity in the contention resolution message. The contention based RA is used only on a PCell (primary serving cell).

The non-contention based RA is normally initiated by the network. In the non-contention based RA:
  The network sends the RA preamble, also referred to as a dedicated preamble, to the UE. Thus, there is no contention resolution phase;
  The UE sends the assigned preamble during the RACH opportunity to the eNB;
  The network responds to the UE with at least a RA preamble identifier and an initial UL grant in the RAR message.

The UE uses the initial allocation received in the RAR message to transmit further details related to a procedure such as cell change. The contention based RA is also used on the PCell. In case of CA, only non-contention based RA is possible on the SCell.

Self Organizing Network

Advanced technologies such as E-UTRAN and UTRAN may employ the concept of self organizing network (SON). The objective of a SON entity is to allow operators to automatically plan and tune the network parameters and configure the network nodes.

Typically, tuning is performed manually, which may consume an enormous amount of time, resources and which may require considerable involvement of work force. In particular due to the network complexity, large number of system parameters, IRAT technologies, etc., it is very attractive to have reliable schemes and mechanisms that can automatically configure the network whenever necessary. This can be realized by a SON, which can be visualized as a set of algorithms and protocols performing the task of automatic network tuning and configuration. To perform automatic tuning and configuration, the SON node generally requires measurement reports and results from other nodes such as the UE and the base station. The SON can also be used for automatically changing the state of cells from active to idle or vice versa.

UE Timing Control

As seen in FIG. 5, there is a predefined relation between the UL-DL frame timing in LTE. The transmission of a UL radio frame number i from the UE starts $(N_{TA}+N_{TA\ offset}) \times T_S$ seconds before the start of a corresponding DL radio frame at the UE, where $0 \leq N_{TA} \leq 20512$ and $N_{TA\ offset}=624$ for frame structure type 2 (LTE TDD).

However, due to the drift in the DL transmission timing and also due to UE mobility, the relation between the UL and DL timing generally needs to be preserved. Therefore, the UE UL transmission and DL reception timings may be controlled and managed by a set of predefined rules, predefined requirements and signaling as described below.

In a cell in LTE, different UEs may be located at different locations in a cell. Also the UEs may be located in a very large cell, e.g., cell range up to 100 km (kilometers). In this case, the signals from different UEs in the cell may be received at the serving radio node (e.g., serving eNB) at different times.

However, in order to ensure orthogonality of the signals received in UL at the receiver of the radio node, transmissions from multiple UEs in the cell generally need to be time aligned. This means the transmit timing of the UEs, which are generally under the control of the same eNB, are adjusted to ensure that their received signals arrived at the eNB receiver at the same time or at least within a fraction of a cyclic prefix (CP). This ensures that the eNB receiver is able to use the same resources (same DFT or FFT resource) to receive and process the signals from multiple UEs. This is achieved by sending timing advanced (TA) commands to the UE such as every 500 ms. The UE then adjust its transmission timing (e.g., increase or decrease) depending upon the TA value.

In CA with two or more UL carriers, multiple TA groups (TAG) can be configured by the network. In this case, the TA may be applied independently on each TAG. Each TAG contains at least one serving cell. At least one TAG includes a primary serving cell and each remaining TAG includes at least one secondary serving cell.

In addition to the TA based adjustment of the UL transmit timing, there is also predefined requirement on the UE to autonomously adjust its UL timing in response to the drift in the eNB transmit timing. More specifically, the UE is generally required to follow the change in the frame transmit timing of the serving cell and correspondingly adjust its transmission timing for each transmission. The UE typically uses signals such as a CRS (common reference signal) and synchronization signals to track the DL timing of the serving cell.

The serving cell timing may change due to different reasons including variation in radio conditions, clock imperfections, maintenance activities, and deliberate attempt by the network to change timing among others. Generally, it is also required that the UE changes its UL transmit timing (increase or decrease) with a certain predefined slew rate. This is to ensure that the UE does not change the timing too fast. This requirement stems from the fact that if the UE changes its UL transmit timing in the order of several µs from subframe to subframe, the base station receiver may not be able to cope with the received signals. This may result in degradation of demodulation of signals transmitted by the UE. Typically the eNB receiver can handle with some acceptable performance degradation, the UE received signal whose transmission timing has been changed up to 1-2 µs in a single transmission. However, if the UE changes its transmission timing in the order of 3 µs or more, the receiver at the radio node may not be able to receive or demodulate the UE received signal.

The predefined rules and requirements governing the UL timing adjustments with predefined slew rates depend upon the BW and can include:

- A maximum magnitude of the UL timing change in one adjustment step as T1, e.g., 100 ns for 5 MHz BW;
- A minimum aggregate UL timing adjustment rate as T2 over certain of time, e.g., 300 ns per second for 5 MHz BW;
- A maximum aggregate UL timing adjustment rate as T3 over certain period of time, e.g., 1 µs per 200 ms for 5 MHz BW.

If the UE receives the TA command from the network while autonomously changing the UL timing, then it may stop the autonomous adjustment and instead applies the TA command to change its timing.

In CA, multiple TA groups are configured by the network, and the UE may independently adjust its UL timing on each set of serving cells in a TAG. In this case, the UE uses PCell as the DL timing references for the TAG containing the PCell, and uses the SCell as the DL timing reference for the TAG containing SCell for adjusting its UL transmit timings on each TAG.

Measurements

The measurements are performed by the UE and/or the radio node. Theses are described below:

Cell identification or cell search may also be considered a type measurement. When a UE is powered on, it first searches cells on possible frequencies (or channels) in a frequency band. A multi-RAT multi-band UE searches all its supported bands for each supported RAT unless explicitly forbidden. The UE attempts to find the most suitable frequency channel in a particular band in use in that region. The UE then proceeds with remaining tasks or more specifically may acquire the cell timing and cell ID of neighbor cells, which are operated on the same frequency channel found in the first step. The process of searching frequency channel is often called as the initial cell search. Terms such as band scanning and frequency search are also commonly used for the initial cell search in literature.

After acquiring frequency synchronization, the UE may acquire system information of the detected cell found during the initial cell search, and acquire information about neighbor cells. The UE typically uses the neighbor cell information (e.g., neighbor cell list) to start a neighbor cell search. The UE then continuously attempts to find the cell timing and physical ID (identification) of the cells operating on the acquired carrier frequency. Once the UE camps on the strongest (e.g. best, or most suitable) cell, the broadcast information is downloaded and the location area update in UMTS or tracking area update in LTE is carried out. If authentication fails, the UE attempts to connect to another suitable cell or to a cell of another allowed PLMN.

The UE may perform measurements on the serving and on the neighbor cells over some known reference symbols or pilot sequences. The measurements may be performed on cells on an intra-frequency carrier(s), inter-frequency carrier(s), and inter-RAT carriers(s) depending upon whether (or not) the UE is capable of supporting that RAT.

The UE may receive measurement configuration or an assistance data and/or information, which is a message or an information element (IE) sent by the network node (e.g., serving eNB, positioning node, etc.) to configure the UE to perform requested measurements. For example the message or the IE may contain information related to the carrier frequency, RATs, types of measurement (e.g., RSRP), higher layer time domain filtering, measurement bandwidth related parameters, and so on.

Some measurements may also require the UE to measure signals transmitted by the UE in the UL. The measurements are performed by the UE in RRC connected state and in low activity RRC states (e.g., idle state, CELL_FACH state in HSPA, URA_PCH and CELL_PCH states in HSPA). In multi-carrier or CA scenario, the UE may perform the measurements on the cells on the primary component carrier (PCC) and on the cells on one or more secondary component carriers (SCCs).

The measurements may serve various purposes. Some example purposes may include: mobility, positioning, self organizing network (SON), minimization of drive tests (MDT), operation and maintenance (O&M), network planning and optimization, etc.

The measurements are typically performed over a relatively long time duration in the order of few 100 ms to few seconds. The same measurements are applicable in single carrier and in CA. However, in CA, the measurement requirements may be different. For example the measurement period may be relaxed or made more stringent in CA depending upon whether or not the SCC is activated or not. This may also depend upon the UE capability i.e., whether or not a CA capable UE is able to perform measurement on SCC with or without gaps.

Examples of mobility measurements:
  in LTE include:
    Reference symbol received power (RSRP);
    Reference symbol received quality (RSRQ);
  in HSPA include:
    Common pilot channel received signal code power (CPICH RSCP);
    CPICH Ec/No;
  in GSM/GERAN includes GSM carrier RSSI;
  in CDMA2000 systems include:
    Pilot strength for CDMA2000 1xRTT;
    Pilot strength for HRPD.
The mobility measurement may also include identifying or detecting a cell, which may belong to LTE, HSPA, CDMA2000, GSM, etc. Identification of a cell by the UE may comprise at least acquiring a cell identifier of a cell. The cell identifier can be a PCI, CGI or any type of identifier which denotes the cell.

Examples of positioning UE measurements in LTE include:
  Reference signal time difference (RSTD);
  UE RX-TX time difference measurement. This measurement requires the UE to perform measurement on the DL reference signal as well as on the UL transmitted signals.
Example of other measurements which may be used for MDT, SON or for other purposes include:
  Control channel failure rate or quality estimate:
    Control channel failure rate:
      Paging channel failure rate;
      Broadcast channel failure rate;
    Random access failure:
      Number of random access (RA) failures over a time period;
      Percentage or fraction of RA failure, i.e., ratio of RA failures to RA attempts;
  Physical layer problem detection:
    Radio link monitoring (RLM), which includes:
      Out of synchronization (out of sync) detection;
      In synchronization (in-sync) detection;
    Radio link failure (RLF).
The UE may also perform measurements on the serving cell (primary cell) in order to monitor the serving cell's performance. This is referred to as radio link monitoring (RLM) or RLM related measurements in LTE. For RLM, the UE monitors the DL link quality based on the cell-specific reference signal in order to detect the DL radio link quality of the PCell.

To detect out of sync and in sync, the UE compares the estimated quality with the thresholds Qout and Qin, respectively. The thresholds Qout and Qin are defined as a level at which the DL radio link cannot be reliably received and corresponds to 10% and 2% BER (block error rate) of a hypothetical PDCCH (physical dedicated control channel) transmissions, respectively.

In non-DRX, the DL link quality for out of sync and in sync are estimated over an evaluation periods of 200 ms and 100 ms respectively.

In DRX, the DL link quality for out of sync and in sync are estimated over the same evaluation period, which scale with the DRX cycle e.g., period equal to 20 DRX cycles for DRX cycle greater than 10 ms and up to 40 ms.

When in the connected state, the UE reports the neighbor cell measurements to the serving node. The measurement reporting can be performed by one or more mechanisms depending upon various considerations including, among others, the type of measurement and the network configuration. Examples of measurement reporting mechanism include periodic reporting, event triggered reporting, one shot reporting upon explicit network request, event triggered periodic reporting, and reporting of logged measurements when certain condition is met (e.g., logging timer expires, buffer size is above threshold).

In response to the reported UE measurement, the serving node can make a determination related to whether to perform a radio operational task or a radio resource management action. For example, the serving node may send mobility command to the UE for the purpose of cell change, modify one or more parameters, and so on. Examples of cell change include handover, RRC connection re-establishment, RRC connection release with redirection, PCell change in CA, and PCC change in PCC.

In idle state or low activity state, the UE does not report the measurements to the network. Rather, it autonomously uses one or more measurements for radio operational task or radio resource management action such as cell change and modification of radio related parameters (e.g., measurement rate or intensity of doing measurement). Examples of cell change in idle state or low activity state include cell selection and cell reselection.

A legacy single carrier UE (i.e., non CA capable) typically has a receiver that is able to receive data only on one carrier frequency (e.g., 5 MHz in WCDMA, up to 20 MHz in LTE. Note that one carrier in LTE can be up to 20 MHz. This means that such a UE needs measurement gaps to perform inter-frequency and inter-RAT measurements.

The measurements may belong to any category. For example they may be neighbor cell measurements (e.g., PCI identification in LTE or HSPA; ECGI or CGI identification in LTE FDD/TDD; HSPA FDD/TDD, LTE RSRP or RSRQ measurements in LTE; CPICH RSCP, CPICH Ec/No measurements in WCDMA). Other examples include: GSM carrier RSSI measurement, GSM BSIC identification, CDMA2000 measurements (e.g., CDMA 2000 1x Pilot Strength, HRPD Pilot Strength).

There may also be positioning related measurements such as RSTD in LTE. The UE may also be able to perform other types of measurements including measurements for minimization of drive tests such as pilot measurements or BCH failure rate, and measurements for self organizing network (SON).

During the measurement gaps, the UE performs measurement on the target frequency or target RAT and therefore it cannot receive the data from the serving cell. There are basically two types of gaps for performing measurements:

Network configurable measurement gaps. Examples include compressed mode gaps in HSPA and measurement gaps in LTE;

UE autonomous gaps including gaps autonomously created by the UE when the UE is requested to read system information of a neighbor cell.

In WCDMA, the measurement gaps are referred to as "compressed mode (CM) patterns". The CM pattern comprises periodical gaps of 7 or more slots occurring with certain periodicity. During the gaps, the UE switches from the serving WCDMA carrier to the WCDMA inter-frequency or inter-RAT frequency (e.g., to LTE carrier) to perform the measurement on the target inter-frequency or inter-RAT frequency.

In WCDMA, a separate CM pattern is to be activated to perform the measurement on each inter-frequency or inter-RAT carrier. The CM patterns allow the UE, at least to some extent, to recover the data lost during the gaps e.g., by lowering the spreading factor and increasing the BS transmitted power to the UE during the recovery frames.

In LTE, the inter-frequency and inter-RAT measurements are also performed during periodical gaps, which occur with periodicity of 40 ms (pattern #0) or 80 ms (pattern #1). Each gap during which the UE performs inter-frequency and inter-RAT measurements is 6 ms. Unlike WCDMA, the loss in data during the LTE gaps cannot be compensated. This is because there is no concept of compressed frames and/or sub-frames. This means in LTE, the peak data rate may be reduced due to the measurement gaps, where data cannot be transmitted.

In HSPA and LTE, the serving cell can request the UE to acquire the system information (SI) of the target cell. More specifically the UE reads the SI to acquire the cell global identifier (CGI), which uniquely identifies the target cell.

The UE may read the SI of the target cell (e.g., intra-frequency, inter-frequency, inter-RAT cell) upon receiving an explicit request from the serving network node, e.g., RNC in HSPA or eNB in LTE, via RRC signaling. The acquired SI is then reported to the serving cell. The signaling messages are defined in the relevant HSPA and LTE specifications.

To acquire the SI which contains the CGI of the target cell, the UE reads at least part of the SI including master information block (MIB) and the relevant system information block (SIB) as described later. Terms SI reading/decoding/acquisition, CGI/ECGI reading/decoding/acquisition, CSG SI reading/decoding/acquisition may be interchangeably used herein to have same or similar meaning.

The reading of SI for the acquisition of CGI is carried out during measurement gaps which are autonomously created by the UE. The number of gaps and their size may thus depend upon UE implementation as well as on other factors including radio conditions and type of SI to be read. The term autonomous indicates that the network does not know exactly when the gaps are created. The gaps may be created at least in the DL, in which case the UE cannot receive data. Autonomous gaps may also be created in the UL, especially when acquiring the SI of the target inter-frequency cell or inter-RAT cell. In this case, the UE can neither receive nor transmit data.

In contrast, normal periodical measurement gaps (aka compressed mode pattern, transmission gaps, etc) are used to perform, for instance mobility measurements such as RSRP and RSRQ. They are configured by the network by sending explicit configuration to the UE. Hence, in this case, the network may precisely know the location in time of each gap.

Autonomous gaps are generally needed since the UE cannot receive and/or transmit data in parallel with the reading of the SI of a target cell. The reason is that the simultaneous operation may increase complexity, memory requirements and power consumption. Furthermore, a legacy single carrier UE (non CA capable) typically has a single receiver for receiving data only on one carrier frequency, e.g., 5 MHz BW (bandwidth) in WCDMA or up to 20 MHz BW in LTE (note that a single carrier in LTE can be up to 20 MHz wide). This means that the legacy UE may need autonomous gaps to acquire at least the inter-frequency and inter-RAT SI. The SI reading may also be used for acquiring additional information such as CSG and/or hybrid CSG indicators.

In LTE, the UE reads the MIB and SIB1 (SystemInformationBlockType1) of the target E-UTRAN cell (which can be FDD or TDD) to acquire its cell global identifier—the ECGI—when the target cell is E-UTRAN intra- or inter-frequency cell. The MIB is transmitted periodically with a periodicity of 40 ms and repetitions made within 40 ms. The first transmission of the MIB is scheduled in subframe 0 of radio frames for which the SFN mod 4=0, and repetitions are scheduled in subframe 0 of all other radio frames. The MIB may comprise basic information such as cell bandwidth and SFN.

The LTE SIB1, as well as other SIB messages, may be transmitted on DL-SCH (downlink shared channel). The SIB1 may be transmitted with a periodicity of 80 ms and repetitions made within 80 ms. The first transmission of the SIB1 may be scheduled in subframe #5 of radio frames for which the SFN mod 8=0, and repetitions may be scheduled in subframe #5 of all other radio frames for which SFN mod 2=0. The LTE SIB1 may also indicate whether a change has occurred in the SI messages. The UE may be notified about a coming change in the SI by a paging message, from which it will know that the SI will change at the next modification period boundary. The modification period boundaries may be defined by SFN values for which SFN mod m=0, where m is the number of radio frames comprising the modification period. The modification period may be configured by system information. The SIB1 contains information such as CGI, CSG identity, frequency band indicator, etc.

In HSPA, the UE reads the MIB and SIB3 of the target cell UTRAN cell to acquire its CGI (aka Neighbor Cell SI) when the target cell is a UTRAN intra-frequency or inter-frequency cell [2]. The MIB provides basic information such as SFN and SIB3 contains the CGI of the target cell.

The procedure for inter-RAT SI acquisition during autonomous gaps may also be specified for inter-RAT UTRAN, inter-RAT E-UTRAN, inter-RAT GEM/GERAN, inter-RAT CDMA2000 among others:

In case of inter-RAT UTRAN, the UE served by the E-UTRAN cell reads the MIB and SIB3 of the target UTRAN cell during the autonomous gaps to acquire the UTRAN cell SI such as the UTRA cell CGI;

In case of inter-RAT E-UTRAN, the UE served by the UTRAN cell reads the MIB and SIB1 of the target E-UTRAN cell (which can be FDD or TDD) during the autonomous gaps to acquire E-UTRAN cell SI such as the E-UTRA cell CGI;

In case of inter-RAT CDMA2000, the UE served by the E-UTRAN cell reads the relevant broadcast information of the target CDM2000 cell to acquire CDM2000 cell SI such as the CDMA2000 cell CGI. CDMA2000 is a generic term. The target CDMA2000 cell can belong to CDMA2000 1x RTT or HRPD systems.

The target cell whose SI can be acquired can be an intra-frequency cell, an inter-frequency cell or an inter-RAT cell (e.g., UTRAN, GERAN, CDMA2000 or HRPD). There are at least few well known scenarios for which the serving cell may request the UE to report the CGI of the target cell:

Verification of CSG cell;
Establishment of SON ANR (automatic neighbor relation);
MDT (minimization of drive tests).

The UE also performs and report channel state information (CSI) measurements to the network node to facilitate among others scheduling, link adaptation, and antenna mode selection among others. In LTE, CSI measurements include:

RI (rank indication)—indicates recommended number of layers for DL transmission using DL multi antenna scheme;
PMI (precoder matrix indication)—indicates recommended precoder matrix to be used for the DL transmission;
CQI (channel quality indication)—indicates the highest MCS (modulation and coding) scheme or transport format that can be used for DL transmission.

The CSI measurements and reporting are configured at the UE by its serving node. In LTE, the network node (e.g., eNB) can configure the UE to report the CSI using periodic and/or aperiodic mechanisms.

The measurements are also performed by a radio node on signals related to a UE. The measurement can be performed on signals transmitted by a UE and/or on signals transmitted by the radio node to a UE. Examples of radio nodes include, among others, base stations, NodeBs, eNBs, base transceiver stations (BTS), relays, measuring nodes (e.g., location measurement unit (LMU)).

Examples of UTRAN measurements, which are defined in 3GPP Technical Specifications TS 25.215 and TS 25.225, include received total wide band power, signal to interference radio (SIR), SIR error, transmitted carrier power, transmitted code power, transport channel BER, physical channel BER, RTT (round trip time), acknowledged PRACH preambles, SFN-SFN observed time difference, Angle of Arrival (AoA), UTRAN GPS Timing of Cell Frames for UE positioning, UTRAN GANSS Timing of Cell Frames for UE positioning, etc.

Examples of E-UTRAN measurements, which are defined in TS 36.214, include DL RS TX power, RIP (received interference power), thermal noise power, timing advance (TADV), eNB Rx-Tx time difference, E-UTRAN GNSS Timing of Cell Frames for UE positioning, Angle of Arrival (AoA), UL Relative Time of Arrival (RTOA) for UTDOA positioning, etc.

The overall serving cell or neighbour cell measurement quantity results may comprise of non-coherent averaging of 2 or more basic non-coherent averaged samples. The exact sampling depends upon the implementation and is generally not specified. An example of RSRP measurement averaging in E-UTRAN is shown in FIG. 6. The figure illustrates that the UE may obtain the overall measurement quantity result by collecting four non-coherent averaged samples or snapshots (each of 3 ms length in this example) during the physical layer measurement period (i.e., 200 ms) when no DRX is used or when DRX cycle is not larger than 40 ms. Every coherent averaged sample is 1 ms long. The measurement accuracy of the neighbour cell measurement quantity (e.g., RSRP or RSRQ) is specified over this physical layer measurement period. It should be noted that the sampling rate is generally UE implementation specific. Therefore, in another implementation a UE may use only 3 snap shots over 200 ms interval. Regardless of the sampling rate, it is important that the measured quantity fulfils the performance requirements in terms of the specified measurement accuracy.

In case of RSRQ, both RSRP (numerator) and carrier RSSI (denominator) should be sampled at the same time to follow similar fading profile on both components. The sampling also depends upon the length of the DRX cycle. For example for DRX cycle>40 ms, the UE typically takes one sample every DRX cycle over the measurement period.

A similar measurement sampling mechanism may be used for other signal measurements by the UE and also by the BS for UL measurements.

In-Device Coexistence Involving External Wireless Systems

A cellular UE can be equipped with external wireless system, i.e., non-cellular, communication systems. Examples of such external wireless systems which can be located on a cellular device or UE include LTE, WiFi, Bluetooth transceivers, Global Navigation Satellite System (GNSS) receiver, sports or medical related short range wireless devices, medical gadgets, cordless telephones, etc. Examples of GNSS include GPS, Galileo, COMPASS, and GANSS. The transmit power of one or more transmitters (e.g., LTE) may be much higher than which can be managed by a receiver of another system (e.g., WLAN). In particular, due to extreme proximity of these radio transceivers in the same device, the impact of the aggressor system's interference on a victim radio receiver can be severe. One example of in-device co-existence is the LTE TDD band 40 and ISM band (2.4 GHz). Another example is the HSPA/LTE FDD band VII/7 and ISM band (2.4 GHz).

There are known ways to mitigate interference in the in-device co-existence scenario (i.e., between cellular systems and in-device external wireless systems). For example, the network can allow the UE to autonomously create gaps on cellular systems when the external wireless system (e.g., WLAN) is accessed. The network can also perform inter-frequency handover to avoid interference. The network can also configure the UE in a long DRX cycle, and during the DRX OFF duration the UE can use the external wireless systems. The network can also configure the UE with a pattern of subframes (e.g., repeated every 40 ms or subframes) to partition the time to be shared between the cellular system (e.g., LTE band 40) and external wireless systems (e.g., WLAN).

Multi-SIM Operation

The subscriber identity module (SIM) may contain subscriber related information such as the subscriber's PLMN ID, supported RATs by an operator, etc. A public land mobile network (PLMN) is a set of an access network, core network and other necessary mobile network elements or entities forming a complete mobile network. A SIM (i.e., formerly for only GSM) or USIM (i.e., for UMTS, LTE or even GSM/UMTS/LTE) card may be interchangeably used. For consistency, the term SIM will be used to encompass USIM or any type of SIM regardless of supported technologies and/or RATs.

A UE may include capabilities to establish two or more cellular communication operations with different PLMNs in parallel. This may be realized through a multi-SIM operation in a UE, and such a UE is termed as a multi-SIM capable UE. The PLMNs involved in the multi-SIM operation typically belong to different operators, but they may also belong to the same operator. In both cases, all supported SIMs are typically associated with independent subscriptions.

Different SIMs may operate using the same technology and/or RAT or different technologies and/or RATs at the same time. Some of the existing UE implementations generally support dual SIM operation in which two SIMs can operate simultaneously. For example, the dual SIMs of the UE may support GSM/UTRAN FDD and LTE. As another example, the SIMs may simultaneously operate on different LTE carriers belonging to different operators' PLMNs. In yet another example, the dual SIMs may operate simultaneously on LTE and HSPA carriers belonging to different operators' PLMNs.

The underlying radio technology used for realizing the multi-SIM operation may be through a single radio, through multiple radios, or even through a broad band radio. In single radio case, one SIM may be used for radio communication at a time; however, the UE may perform measurements or may receive paging or other messages on the other SIMs which can cause periodic or sporadic interruptions on communication related to the first SIM. In multi-radio operation, two or more SIMs can establish simultaneous radio communications. A broadband radio may also support also simultaneous radio communications provided that the carriers are within the supported bandwidth of the broadband radio. The multi-radio or the broadband multi-SIM operation is similar to multi-carrier operation.

An advantage of the multi-radio or the broadband multi-SIM operation is that it enables full simultaneous radio communication with different PLMNs. It also prevents the need for interruptions or gaps for measurements and/or paging on carriers used by other SIMs. A drawback of multi-radio or broadband multi-SIM operation is that the simultaneous radio communications belonging to different PLMNs may cause the out of band emissions (e.g., due to leakage, harmonics, etc) from one carrier pouring into the receiver of another carrier and vice versa degrading the performance.

Heterogeneous Network

In order to mitigate interference in heterogeneous networks (e.g., comprising a mix of high power nodes (e.g., a macro BS) and low power nodes (e.g., pico BS)), a time domain enhanced inter-cell interference coordination ICIC (eICIC) has been specified in release 10 for LTE. In this scenario, the high power node may be viewed as an aggressor node and the lower power node may be viewed as a victim node.

According to the time domain eICIC scheme, a time domain pattern of low interference subframes are configured in the aggressor node. The pattern is also referred to as a low interference transmit pattern or an ABS (almost blank subframe) pattern. An ABS pattern is configured in the aggressor cell and/or node to protect resources in subframes in the victim node and/or cell receiving relatively strong inter-cell interference from the aggressor cell. ABS subframes are typically configured with reduced transmit power or no transmission power and/or reduced activity on some of the physical channels.

In an ABS subframe, the basic common physical channels such as CRS, PSS/SSS, PBCH and SIB1 are transmitted to ensure the operation of the legacy UEs. The ABS pattern can also be categorized as non-MBSFN and MBSFN. In a non-MBSFN ABS pattern, an ABS can be configured in any subframe (MBSFN or non-MBSFN configurable subframes). In a MBSFN ABS pattern, an ABS can be configured only in MBSFN configurable subframes (subframes 1, 2, 3, 6, 7 and 8 in FDD and subframes 3, 4, 7, 8, and 9 in TDD).

The serving eNB (e.g., pico eNB) may signal one or more measurement patterns (aka measurement resource restriction pattern) to inform the UE about the resources or subframes which the UE should use for performing measurements on a target victim cell (e.g., serving pico cell and/or neighboring pico cells). The patterns can be different for serving cell measurements and for neighbor cell measurements. The resources or subframes on which the measurements are to be performed by the UE overlap with ABS subframes in the aggressor cell(s). Therefore, these resources or subframes within a measurement pattern are protected from aggressor cell interference and are interchangeably also called protected subframes or restricted subframes. The serving eNB ensures that each measurement pattern contains at least certain number of protected subframes in every radio frame, e.g., one or two, to facilitate UE to perform measurements. Otherwise, the UE would be unable to meet the predefined measurement requirements when configured with measurement patterns related to operation in a heterogeneous network.

A signal transmit pattern or a measurement pattern comprises of a bit map and typically repeats after certain number of frames e.g., every 4 frames or 40 ms for LTE FDD and every 7 frames or 70 ms for LTE TDD.

Positioning Overview

Several positioning methods exist for determining the location of a target device, which can be any of the wireless device or UE, mobile relay node, PDA, etc. The position of the target device is determined by using one or more positioning measurements, which can be performed by a suitable measuring node or device. Depending upon the positioning, the measuring node can either be the target device itself, a separate radio node (i.e., a standalone node), serving and/or neighboring node of the target device among others. Also depending upon the positioning method, the measurements can be performed by one or more types of measuring nodes. Conventional positioning methods include, e.g.:

Satellite based techniques—measurements performed by the target device on signals received from the navigational satellites are used for determining target device's location. For example either GNSS or A-GNSS (e.g., A-GPS, Galileo, COMPASS, GANSS, etc) measurements are used for determining the UE position;

OTDOA—UE measurements related to time difference of arrival of signals from radio nodes (e.g., UE RSTD measurement) are for determining UE position in LTE or SFN-SFN type 2 in HSPA;

UTDOA—measurements performed at a measuring node (e.g., LMU) on signals transmitted by a UE are used for determining the UE position;

Enhanced cell ID—uses one or more of measurements for determining the UE position e.g., any combination of UE Rx-Tx time difference, BS Rx-Tx time difference, timing advanced (TA) measured by the BS, LTE RSRP/RSRQ, HSPA CPICH measurements (CPICH RSCP/Ec/No), angle of arrival (AoA) measured by the BS on UE transmitted signals, etc for determining UE position. The TA measurement is performed using use either UE Rx-Tx time difference or BS Rx-Tx time difference or both;

Hybrid methods—rely upon measurements obtained using more than one positioning methods for determining the UE position.

In LTE, the positioning node such as a E-SMLC or a location server may configure the UE, eNB or LMU to perform one or more positioning measurements depending upon the positioning method. The positioning measurements are used by the UE, a measuring node and/or by the positioning node to determine the UE location. The positioning node may communicate with a UE using a LPP protocol and with eNB using a LPPa protocol.

Generally, regulators may divide a frequency spectrum or a frequency band available for wireless communication into several blocks of spectrum or frequencies. One or multiple frequency blocks are then assigned, or allocated, to different operators. A small frequency band may also be entirely assigned to a single operator. However, most frequency bands are large enough and are split among multiple operators.

The frequency assignment principle and criteria depend upon the particular regulatory authority. For example, the TDD frequency band 38 (2.6 GHz—see Table 3 above) can be divided into 10 blocks, in which each block is 5 MHz wide. This 50 MHz spectrum can be divided among three operators: 3×5 MHz, 3×5 MHz and 4×5 MHz. If the operators want unsynchronized TDD operation, one drawback may be that each operator will have to sacrifice e.g., 5 MHz of their spectrum to introduce inter-operator guard band and/or restricted block. Another drawback may be that the vendor has to develop customized radio network equipment for each operator.

The operators can use synchronized TDD operation to remove the need to sacrifice a part of their allocated spectrum. However, in order to ensure synchronized TDD operation, the operators may need to coordinate and agree on a common TDD UL and/or DL configuration (i.e., common frame alignment and common TDD UL/DL configuration). However the coordination and determination of the most suitable TDD configuration for all operators using adjacent carriers in the same TDD band may be quite challenging in some scenarios. This may be because the optimum use of a TDD configuration depends upon several factors including type of services, symmetry or distribution between UL and DL traffic, cell size, radio environment, etc.

It may be almost impossible or at least quite challenging to determine a common TDD configuration that can satisfy the demand of all operators due to differences in one more requirements mentioned above. For example an operator which mainly offers data services may require a TDD configuration with larger number of DL subframes compared to UL subframes in a frame. Another operator which mainly offers voice services may require TDD configuration with equal allocation of DL and UL resources (i.e., subframes) in a frame. Yet a third operator may have a very larger number of the subscribers uploading files or sending data. Such operator may require TDD configuration with larger number of UL subframes compared to the DL subframes in a frame. The traffic demand and the types of services used by the subscribers may also change over time. In such scenarios, the coordination among the operators becomes even more complex.

The problem, or challenge, described above is more severe for TDD bands due to cross UL-DL subframe/slot interference, which can be mitigated either by introducing guard band/restricted blocks (see FIG. 3B) or by synchronized operation among operators using adjacent carriers in the same band (see FIG. 3A).

The current LTE TDD co-existence and co-location radio requirements for UE and BS are defined in references 6-7 under the assumption that all TDD carriers are synchronized, i.e., they use the same TDD configuration and are frame synchronized. This means there are no requirements for unsynchronized operation and may lead to severe performance degradation if TDD carriers are not synchronized in practice.

Note that regardless of whether synchronized or unsynchronized operation is used, a peak rate that an operator can provide depends on the amount of spectrum assigned to that operator. In the above example, the peak rates that can be offered by the three operators will be limited due to the peak rate that can be carried on frequency spectrums that are 15 MHz, 15 MHz, and 20 MHz wide, respectively.

The FDD band can also be split among multiple operators (see FIG. 4). The peak data rate offered by an FDD operator also depends upon the amount of the spectrum assigned, or allocated, to that operator. For example, an FDD operator assigned 10 MHz in band 1 (2 GHz—see Table 3) can offer services using LTE channel up to 10 MHz channel. Generally, such operator cannot offer higher data rate using other larger LTE channels such as 15 or 20 MHz channel. Similarly the operator also cannot use intra-band CA to further enhance the bit rate.

SUMMARY

It is in view of above considerations and others that the various embodiments disclosed herein have been made.

Method(s), apparatus(es) and/or system(s) to address problems associated with dividing the frequency spectrum into several bands are described in reference [9] which introduces, at least in part, the concept of time sharing of the shared frequency among operators. In brief, reference [9] proposes methods as well as wireless devices and network nodes for inter-operator time-sharing of a frequency spectrum Fs. In one example embodiment, the same frequency spectrum Fs is allocated, or assigned, to each of a plurality of operators during different time periods such that the same frequency spectrum is shared among the plurality of operators (e.g., all of the plurality of operators).

While the methods, wireless devices and network nodes proposed in reference [9] have several advantages, the inventors of the technology described in this disclosure have realized that there is still a need for further improvements. For example, the introduction of the proposed time sharing principle may require some level of modification to the RRM (radio resource management) and, for instance, to the measurement procedures.

To address the above consideration, one or more method (s), apparatus(es) and/or system(s) are described herein. The one or more method(s), apparatus(es) and/or system(s) are thus, among other things, related to the adaptation of the RRM procedures when the radio spectrum (or, frequency spectrum) is time-shared between operators.

According to an aspect, there is provided a method of allocating a radio spectrum to a plurality of operators. The method comprises allocating a same frequency spectrum to each operator of the plurality of operators during different time periods such that the same frequency spectrum is shared among the plurality of operators. For example, the method may comprise allocating the same frequency spectrum to a first operator during a first time period; allocating the same frequency spectrum to a second operator during a second time period, which is subsequent to the first time period; and allocating the same frequency spectrum to a third operator during a third time period, which is subsequent to the second time period. Furthermore, the method may comprise allocating the same frequency spectrum to the first operator during a fourth time period, which is subsequent to the third time period; allocating the same frequency spectrum to the second operator during a fifth time period, which is subsequent to the fourth time period; and allocating the same frequency spectrum to the third operator during a third time period, which is subsequent to the fifth time period. The different time periods may be non-overlapping in time. Moreover, the different time periods may be equal in length. Alternatively, the different time periods may be unequal in length. Also, any two adjacent time periods may be separated by a guard time.

According to another aspect, there is provided a method performed by a network node, such as a radio network node. The method comprises acquiring information relating to an allocation of a same frequency spectrum to each operator of a plurality of operators during different time periods, wherein the same frequency spectrum is shared among the plurality of operators; and performing a radio resource management, RRM, procedure based on the acquired information. For example, performing the RRM procedure based on the acquired information may comprise adapting the RRM procedure based on the acquired information. The adapting of the one or more RRM procedures may be based on acquired information from another network node. That is, the acquired information may be received from another network node. Additionally, or alternatively, the acquired information may be acquired from information stored (e.g. in a memory) in the network node.

The above-mentioned RRM procedure may include any one or more of:
Performing a radio measurement;
Adjusting a parameter related to a measurement procedure;
Adjusting a parameter related to scheduling;
Performing a random access procedure;
Turning off a radio transmitter and/or radio receiver during one of a plurality of time periods to save power;
Adjusting transmit timing and/or received timing of radio signals;
Receiving and/or transmitting at least one control signal and/or control channel;
Receiving and/or transmitting data;
Processing data in background during one or plurality of time periods other than a time period during which the network node performs a radio communication;
Configuring a transmit pattern of low interference time slots or subframes to mitigate interference in heterogeneous network;
Configuring a pattern of measurement time slots or subframes for measuring in heterogeneous network;
Adjusting and signaling a frame number;
Adapting parameters for enabling operation of another RAT, in-device external wireless system or radio communication related to another SIM during one or plurality of time periods other than time periods during which the network node performs the radio communication.

Furthermore, adapting one or more RRM procedures may comprise:
Adapting frame numbering related parameters;
Adapting measurement configuration parameters;
Adapting scheduling of data;
Adapting measurement requests;
Adapting random access parameters;
Adapting power control parameters;
Saving power consumption by turning off a receiver and/or a transmitter during one or plurality of time periods other than time periods during which the network node performs the radio communication;
Adapting parameters enabling other system operation in one or plurality of time periods other than time periods during which the radio network node performs the radio communication; and
Adapting parameters for enabling operation in a heterogeneous network.

The method may also comprise transmitting capability information to another network node or to a user equipment, wherein said capability information indicates that the network node is capable of adapting one or more RRM procedures when performing a radio communication during a time period allocated to the network node. Additionally, or alternatively, the method may comprise receiving capability information from another network node, wherein said capability information indicates that the another network node is capable of adapting one or more RRM procedures when performing a radio communication during a time period allocated to the another network node. Additionally, or alternatively, the method may comprise receiving capability information from a user equipment, wherein said capability information indicates that the user equipment is capable of adapting one or more RRM procedures when performing a radio communication during a time period allocated to the user equipment.

According to still another aspect, there is provided a network node configured to operate, execute or otherwise perform the above-mentioned method. To this end, the network node may comprise a wireless interface; a processor; and a memory storing computer program code, which, when run in the processor causes the network node to acquire information relating to an allocation of a same frequency spectrum to each operator of a plurality of operators during different time periods, wherein the same frequency spectrum is shared among the plurality of operators; wherein the wireless interface is configured to perform a radio resource management, RRM, procedure based on the acquired information. The network node may also be configured to adapt RRM procedures based on the acquired information. Furthermore, the wireless interface may be configured to transmit capability information to another network node or a user equipment, wherein said capability information indicates that the network node is capable of adapting one or more RRM procedures when performing communication during a time period allocated to the network node. Additionally, or alternatively, the wireless interface may be configured to receive capability information from another network node, wherein said capability information indicates that the another network node is capable of adapting one or more RRM procedures when performing a radio communication during a time period allocated to the another network node. Additionally, or alternatively, the wireless interface may be configured to receive capability information from a user equipment, wherein said capability information indicates that the user equipment is capable of adapting one or more RRM procedures when performing a radio communication during a time period allocated to the user equipment.

According to a further aspect, there is provided a method performed by a wireless device, such as a user equipment (UE). The method comprises acquiring information relating to an allocation of a same frequency spectrum to each operator of a plurality of operators during different time periods, wherein the same frequency spectrum is shared among the plurality of operators; and performing a radio resource management, RRM, procedure based on the acquired information. For example, performing the RRM procedure based on the acquired information may comprise adapting the RRM procedure based on the acquired information. The adapting of the one or more RRM procedures may be based on acquired information from a network node and/or from information stored in the UE.

The method may also comprise adapting one or more RRM procedures and wherein adapting one or more RRM procedures comprises one or more of the following:
  Adapting cell identification;
  Identifying a cell;
  Determining frame numbering related parameters;
  Adapting measurement procedure;
  Adapting signal transmissions and/or receptions;
  Saving battery power during one or plurality of time periods other than a time period during which the UE perform a radio communication;
  Adapting measurement types to be performed;
  Using other systems during one or plurality of time periods other than the time period during which the UE perform the radio communication;
  Adapting data processing occasions;
  Processing data in background during one or plurality of time periods other than a time period during which the UE performs the radio communication;
  Adapting power control procedure;
  Adapting random access procedure;
  Adapting timers;
  Adapting synchronization;
  Predefined rules and/or predefined requirements to enable adaption;
  Using adapted parameters; and
  Informing network node of utility of one or plurality of time periods other than a time period during which the UE performs the radio communication and/or tasks or procedures performed by the UE during the said one or plurality of time periods.

Identifying a cell may comprise identifying a cell by the allocated frequency spectrum and a cell identifier, wherein the cell identifier is unique during an allocated time period. Furthermore, identifying the cell may further comprise distinguishing between a plurality of cells operating on the same allocated frequency spectrum but in different time periods.

The method may further comprise meeting one or more pre-defined requirements depending upon the characteristic of the plurality of during different time periods allocated to different operators for using the same frequency spectrum. Meeting one or more pre-defined requirements may comprise meeting a first set of pre-defined requirements if a total number of allocated time periods is below a threshold, otherwise meeting a second set of pre-defined requirements, wherein the second pre-defined requirements are more relaxed than the second set of pre-defined requirements. Additionally, or alternatively, meeting one or more pre-defined requirements may comprise meeting a first set of pre-defined requirements if a duration of one or plurality of time periods is below a threshold otherwise meeting a second set of pre-defined requirements, wherein the second pre-defined requirements are more relaxed than the second set of pre-defined requirements.

The method may also comprise transmitting capability information to a network node or to another UE, wherein said capability information indicates that the UE is capable of adapting one or more RRM procedures when performing a radio communication during a time period allocated to the UE. Additionally, or alternatively, the method may comprise receiving capability information from a network node, wherein said capability information indicates that the network node is capable of adapting one or more RRM procedures when performing a radio communication during a time period allocated to the another network node. Additionally, or alternatively, the method may comprise receiving capability information from another UE, wherein said capability information indicates that the another UE is capable of adapting one or more RRM procedures when performing a radio communication during a time period allocated to the user equipment.

According to yet another aspect, there is provided a UE configured to operate, execute or otherwise perform the above-mentioned method. To this end, the UE may comprise a wireless interface; a processor; and a memory storing computer program code, which, when run in the processor causes the UE to acquire information relating to an allocation of a same frequency spectrum to each operator of a plurality of operators during different time periods, wherein the same frequency spectrum is shared among the plurality of operators; wherein the wireless interface is configured to perform a radio resource management, RRM, procedure based on the acquired information. The UE may also be configured to adapt RRM procedures based on the acquired information. Furthermore, the wireless interface may be configured to transmit capability information to a network node or another user equipment, wherein said capability information indicates that the UE is capable of adapting one or more RRM procedures when performing communication during a time period allocated to the network node. Additionally, or alternatively, the wireless interface may be configured to receive capability information from a network node, wherein said capability information indicates that the network node is capable of adapting one or more RRM procedures when performing a radio communication during a time period allocated to the another network node. Additionally, or alternatively, the wireless interface may be configured to receive capability information from another user equipment, wherein said capability information indicates that the another user equipment is capable of adapting one or more RRM procedures when performing a radio communication during a time period allocated to the user equipment.

BRIEF DESCRIPTION OF THE DRAWINGS

These and other aspects, features and advantages of the embodiments of this disclosure will be apparent and elucidated from the following description of embodiments, reference being made to the accompanying drawings in which.

DETAILED DESCRIPTION OF NON-LIMITING EXAMPLE EMBODIMENTS

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description. Terminologies from 3GPP are used herein only to facilitate explanation and example application. Wireless systems such as WCDMA, WiMax, UMB, GSM, WiFi, LTE, and others may benefit from the technology described herein.

In one or more aspects, a common part of a radio spectrum is shared between multiple networks (i.e., two or more) operated by operators to perform their respective radio communications between their radio network and wireless devices over their allocated disjoint (i.e., non-overlapping) time periods.

The shared frequency spectrum Fs can comprise portions of the radio spectrum allocated to one or more operators. An operator may share some, none, or all of its allocation. The shared spectrum Fs in its entirety can be from a single operator or from multiple operators. Each donating operator need not participate in the time sharing and each sharing operator need not donate. It is only necessary that there is a frequency spectrum Fs that is time shared by two or more networks.

Figure 1:
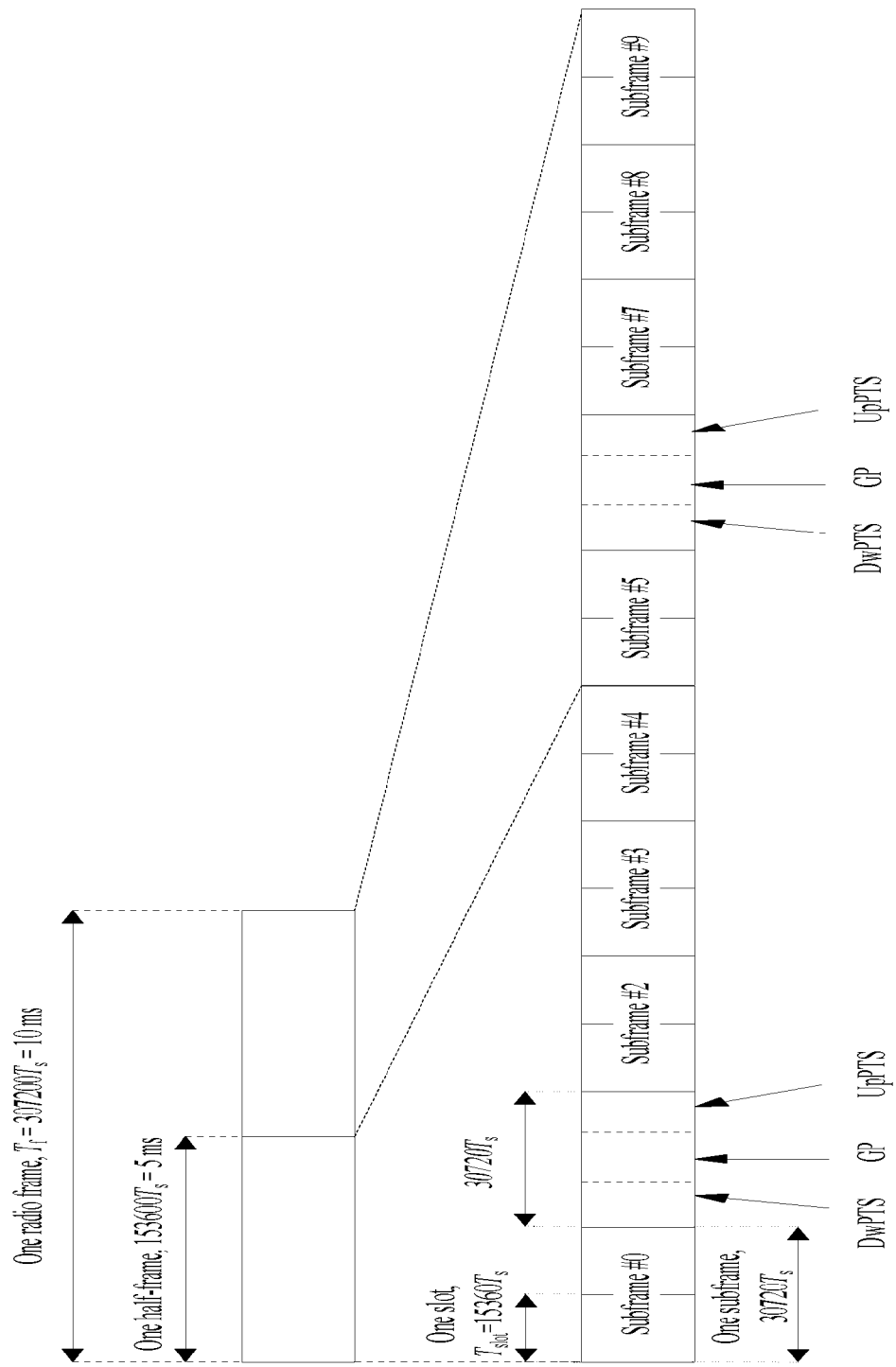
FIG. 1 illustrates a time domain radio frame structure (type 2) for LTE TDD.
Figure 2:
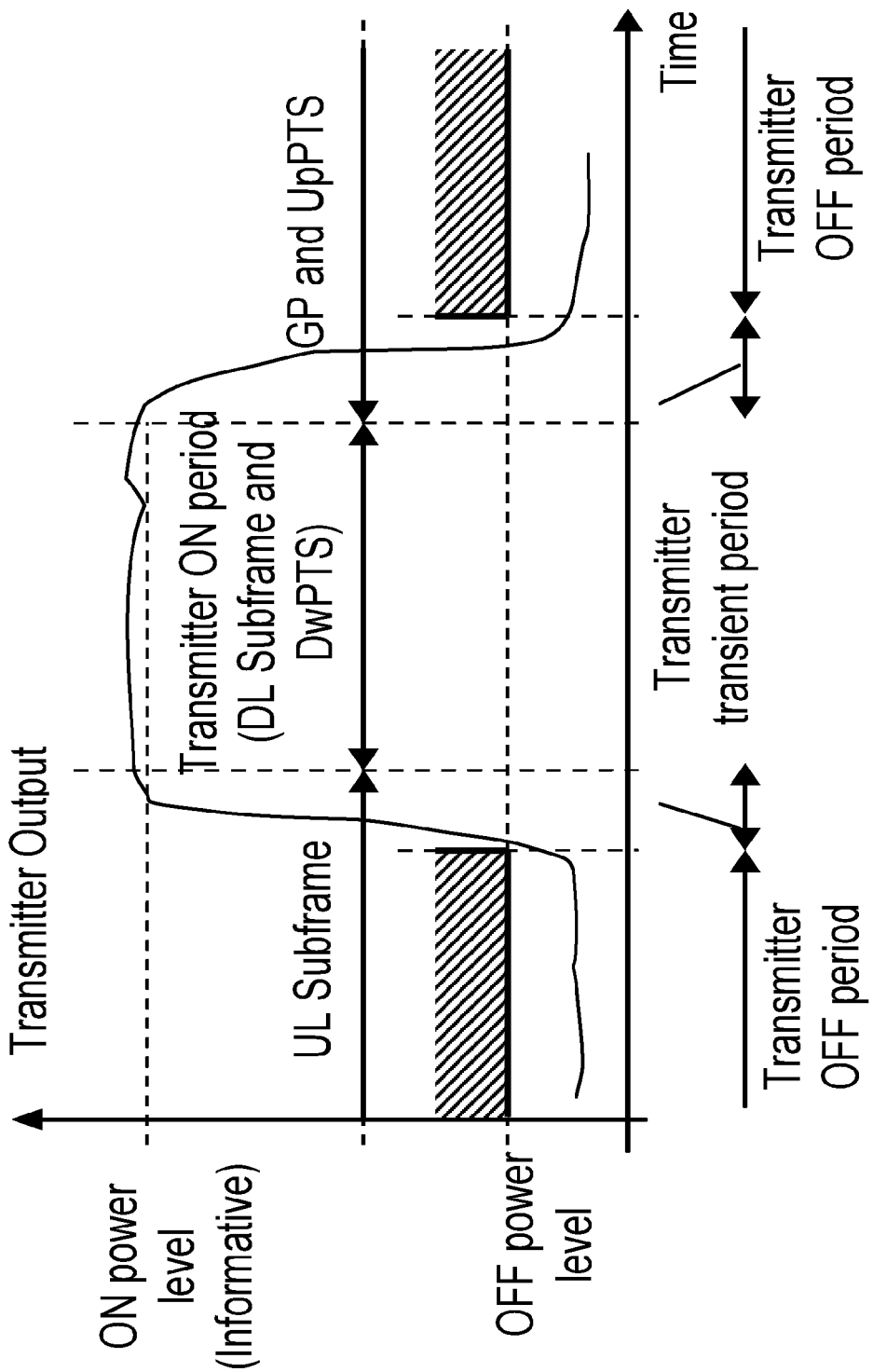
FIG. 2 shows an illustration of the relations of a transmitter ON period, a transmitter OFF period and a transmitter transient period in a LTE TDD BS.
Figure 3A:
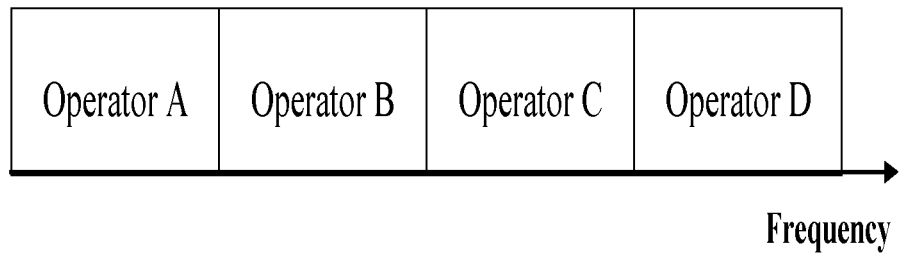
FIG. 3A shows an example allocation of a TDD frequency band to four different operators equally split among the operators.
Figure 3B:
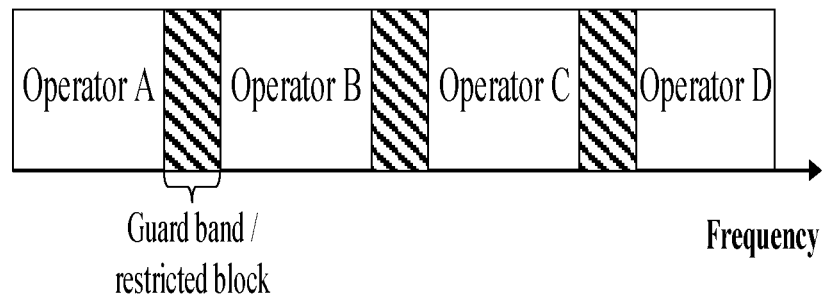
FIG. 3B shows unsynchronized TDD carriers belonging to four different operators, wherein guard bands are required between adjacent carriers.
Figure 4:
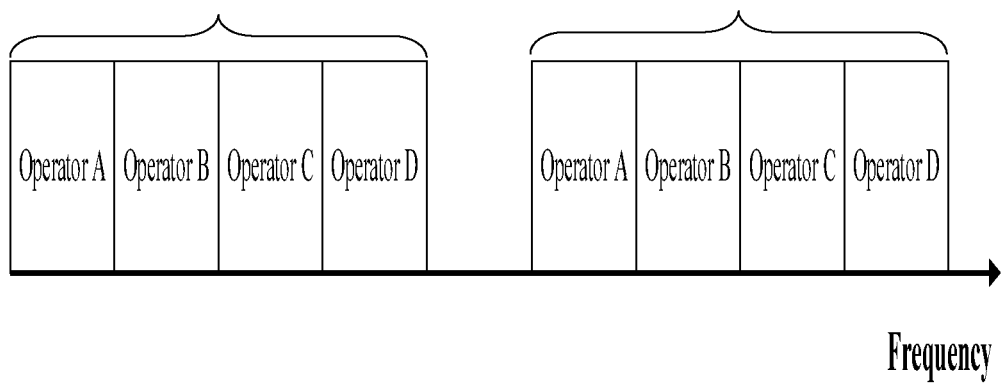
FIG. 4 shows an example allocation of a FDD frequency band to four different operators—also equally split among the operators.
Figure 5:
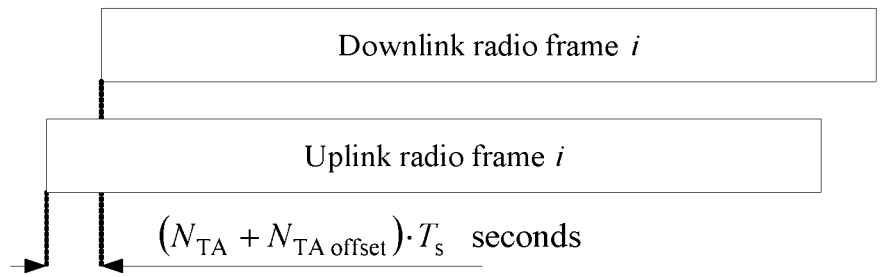
FIG. 5 illustrates a UL-DL timing relation.
Figure 6:
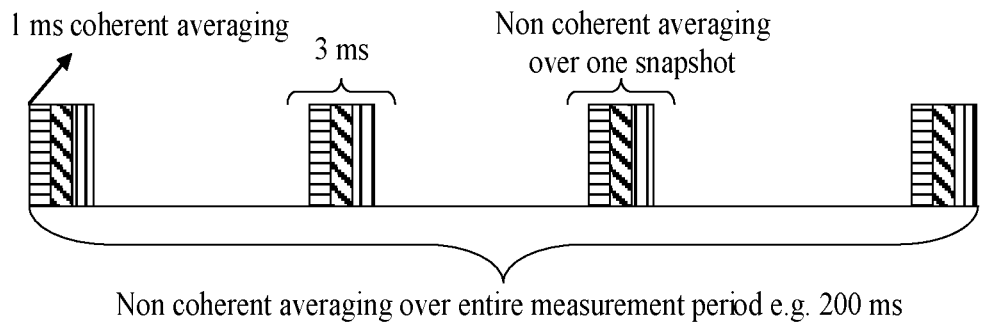
FIG. 6 shows an example RSRP measurement averaging in E-UTRAN.
Figure 7:
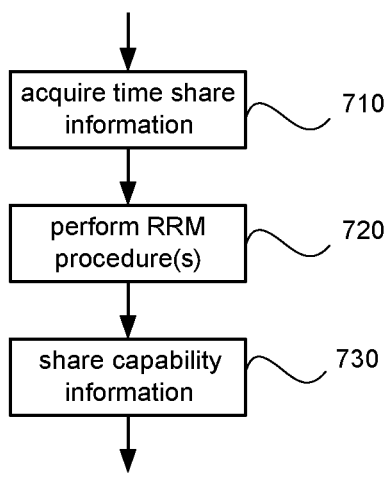
FIG. 7 is a flow chart of an example method suitable for inter-operator time sharing of frequency spectrum.

As illustrated in FIG. 7, in order to realize inter-operator time sharing of spectrum Fs, network nodes and wireless devices may implement methods to:

Acquire information related to time sharing of radio spectrum (act 710); and Adapt one or more RRM procedures based on the acquired information (act 720).

While not strictly required, information related to capabilities of the network and radio nodes and wireless devices may be shared (act 730) to facilitate adaptation of the RRM procedures.

In one aspect, network nodes and wireless devices node may thus execute method(s) to adapt one or more RRM procedures. In these methods, time share information may be acquired including at least a first time period which does not overlap in time with a second time period. One or more radio nodes may share a common part of a radio spectrum for performing a first radio communication over the first time period, and a second radio communication over the second time period. In the methods, one or more RRM related procedures may be adapted, and the adapted RRM procedures may be performed.

The RRM procedures that may be adapted and/or used (e.g. performed) include, among others, any one or more of:

Performing a radio measurement;

Adjusting a parameter related to measurement procedure;

Adjusting a parameter related to scheduling;

Performing a random access procedure;

Turning off a radio transmitter and/or radio receiver during second time period to save power;

Adjusting transmit timing and/or received timing of radio signals;

Receiving and/or transmitting at least one control signal and/or control channel;

Receiving and/or transmitting data;

Processing data in background during second time period;

Configuring a transmit pattern of low interference time slots or subframes to mitigate interference in heterogeneous network;

Configuring a pattern of measurement time slots or subframes for measuring in heterogeneous network;

Adjusting and signaling a frame number;

Operating on another carrier, another RAT, in-device external wireless system or radio communication related to another SIM during second time period.

The first and second radio communication may be respectively associated with first and second PLMN identifiers, which in turn are respectively associated first and second operators. The cell identifier can be any one or more of a physical cell identifier, a cell global identifier, and a scrambling code. The first and second times may include at least one radio frame.

One or both of the first and the second time periods may comprise at least one radio frame. Also, one or both of the first and second time periods may be determined based on one or more of the following:

the first and the second time periods may comprise K and L consecutive radio frames respectively, where $K \geq 1$ and $L \geq 1$; and M number of the first time periods and N number of the second time periods are comprised in a sequence pattern, where $M \geq 1$ and $N \geq 1$ and the length of the pattern is at least the sum of the M first and N second time periods.

The sequence pattern may be associated with one or more of a periodicity of the pattern, a starting reference time of the pattern, and a guard time between at least the first and the second time periods. The radio nodes (e.g., single, first, second) may determine the first and the second time periods and/or the pattern based on one or both of a predefined rule and a configuration performed by a configuring node. Examples of the configuring node include, among others, any of the radio nodes (e.g., single, first, second), a radio network controller, a base station controller, a core network node, an O&M node, an OSS node, and a SON node.

The first radio communication can be performed over the first time period over various operation modes including, among others, time division multiplex (TDD), frequency division duplex (FDD), half duplex FDD (HD-FDD), and DL FDD. Similarly, the second radio communication can be performed over the second time period over various operation modes including, among others, TDD, FDD, HD-FDD, and DL FDD. When the operation mode of the first radio communication is TDD, the TDD configuration may be predefined. When the operation mode of the second radio communication is TDD, the TDD configuration may be predefined.

Each of the single radio node, the first radio node, and the second radio node can be any one of a radio base station, a relay node, evolved NodeB (eNB), Node B, a multi-standard radio network node, and a wireless access point among others.

Generally, multiple operators operating multiple networks may use the shared frequency spectrum Fs over different time periods. During each time period, the entire, or same, shared Fs band is assigned to that operator. Each operator can thus use the shared Fs for radio communication over its allocated time period, which may recur with a repetition time depending upon the assignment principle. Also, the time share approach enables the operators to share fully or partly the radio network equipment. The approach may also enable the operators to offer increased peak rates.

As compared to the traditional spectrum allocation strategy, the method of time sharing of the radio spectrum among two or more operators proposed in reference 9 may result in reduced radio time for the wireless device for performing certain tasks and procedures. For example, the wireless device can perform measurements and transmit signals only during a time period allocated to a cell of an operator (e.g., a PLMN operator) to which the wireless device is connected to or camped on. The adaptation of the RRM procedures ensures that the wireless device and the network node can perform the tasks when the signals are transmitted and/or received only in the assigned, or allocated, time period(s).

The non-limiting aspects described in this disclosure can include, among others:
  Method/apparatus/system of adapting RRM procedures in a network node;
  Method/apparatus/system of adapting RRM procedures in a wireless device;
  Method/apparatus/system of adapting RRM procedures in a positioning node.

Note that some or all disclosed aspects are applicable for operations involving any of the duplex modes (e.g., TDD, FDD, HD-FDD, DL FDD band, etc.) unless explicitly stated otherwise.

TERMINOLOGIES: The following terminologies which are extensively used in this disclosure are described below:

Wireless device: There are several different kinds of wireless devices or user equipments (UE) in terms of different technical and brand names, application scenarios (e.g., USB-dongle, target device), mobile terminal, wireless terminal, wireless terminal used for machine type communication (e.g., M2M communication), wireless device used for device to device communication, and so on. The embodiments are applicable to any type of wireless device or UE;

Radio node: A radio node, also interchangeably referred to as a radio network node, serves wireless devices in a cell or in a coverage area by receiving and/or transmitting radio signals. The radio node maintains a radio communication link between itself and at least one wireless device. Examples of radio nodes include eNodeB, BS, NodeB, donor eNodeB serving relay, donor BS serving, relay node, a multi-standard (MSR) radio node, multi-RAT BS, location measurement unit (LMU) among others;

Network node: A network node can be a radio node as described above or any other type of nodes of the network. The network node may communicate with the radio node. The network node may also communicate with a wireless device using higher layer signaling. The network node need not directly maintain a radio communication link with the wireless device. The network node however may still communicate with another radio node over a wireless communication link. In addition to radio nodes, examples of network nodes include RNC, BSC, core network node, SON, OSS, O&M, network planning and management node, network monitoring node, positioning node among others.

Unless otherwise indicated, network node should be broadly interpreted to include the radio node.

Inter-Operator Time Sharing of Spectrum

Consider a part of a radio spectrum or a frequency band which is available for radio communication between a radio node and a wireless device. Generic terms such as radio spectrum and radio communication can be used. The terms band, frequency band, radio frequency, radio spectrum are interchangeably used and can be viewed as bearing the same meaning. Similarly radio communication includes other well known terms like wireless communication, mobile communication, cellular communication, etc.

In this disclosure, the notation Fs will be used to refer to the radio spectrum shared by multiple operators. Preferably, the shared spectrum Fs is comprised of adjacent carriers, i.e., carriers that are adjacent to each other in the frequency domain, or at least close to each other in frequency. One or more of the disclosed aspects are particularly beneficial when the shared carriers are adjacent. However, this is not a requirement. The shared spectrum Fs can comprise multiple frequency chunks at least two of which are not adjacent. The shared spectrum Fs can be called by different terminologies including, among others, time shared spectrum (TSS), time shared frequency spectrum (TSFS), time shared frequency band (TSB), inter-operator shared spectrum, inter-operator shared frequency band, inter-operator time shared frequency band, and inter-operator time shared spectrum. Some or all disclosed aspects provide benefits even when shared carriers are not all adjacent carriers.

Figure 8:
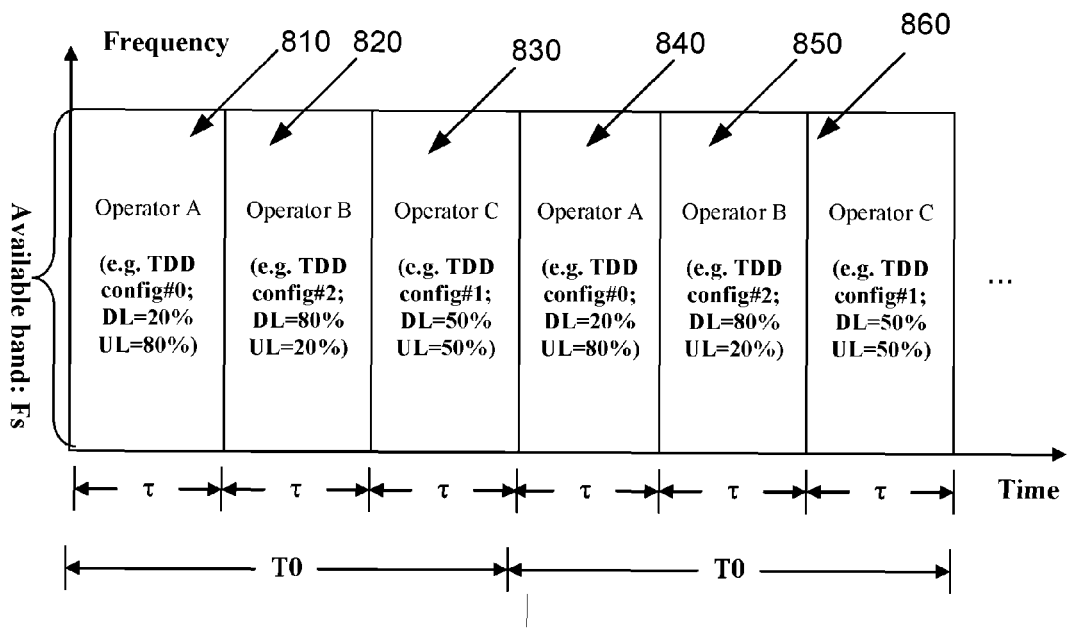
FIG. 8 shows a time sharing example, where an entire, or same, available spectrum Fs is shared by operators for TDD operation in different time slots of equal length ($\tau$)

In an aspect, the available spectrum Fs is time shared among the operators as illustrated in FIG. 8. FIG. 8 illustrates a time sharing example, where an entire, or same, available spectrum Fs shared by operators for TDD operation in different time slots of equal length ($\tau$). In other words, a same frequency spectrum Fs is allocated to each operator of a plurality of operators (here operators A, B, and C, respectively) during different time periods such that the same frequency spectrum Fs is shared among the plurality of operators. As can be seen in FIG. 8, the frequency spectrum Fs can be allocated to a first operator (e.g. operator A) during a first time period 810. The same frequency spectrum can be allocated to a second operator (e.g. operator B) during a second time period 720, which is subsequent to the first time period 810. Also, the same frequency spectrum can be allocated to a third operator (e.g. operator C) during a third time period 830, which is subsequent to the second time period 720.

The figure further shows that each operator (i.e., its network nodes and/or wireless devices) can use the entire spectrum Fs over a time period $\tau$, which occurs periodically once every T0. Thus, in this example, the same frequency spectrum Fs can be allocated to the first operator (e.g. operator A) during a fourth time period 840, which is subsequent to the third time period 830. Also, the same frequency spectrum Fs can be allocated to the second operator (e.g. operator B) during a fifth time period 850, which is subsequent to the fourth time period 740. Also, the same frequency spectrum can be allocated to the third operator (e.g. operator C) during a sixth time period 860, which is subsequent to the fifth time period 750.

The figure further shows that each operator (i.e., its network nodes and/or wireless devices) can use the entire, or same, spectrum Fs over a time period $\tau$, which may occur periodically once every T0. Thus, in this example, the same frequency spectrum Fs can be allocated to the first operator (e.g. operator A) during a fourth time period 840, which is subsequent to the third time period 830. Also, the same frequency spectrum Fs can be allocated to the second operator (e.g. operator B) during a fifth time period 850, which is subsequent to the fourth time period 840. Also, the same frequency spectrum can be allocated to the third operator (e.g. operator C) during a sixth time period 860, which is subsequent to the fifth time period 850.

The time sharing approach enables each operator to use its own preferred TDD configuration during its assigned time period. As shown, operators A, B and C use TDD configurations 0, 2 and 1, respectively, during their respective the assigned time periods.

It is seen that with the time sharing aspect, the entire shared spectrum Fs can be used (i.e., no guard bands are required) while allowing each operator to freely implement its preferred TDD configuration. While not shown, the same operator can also use different TDD configuration in different occurrences of its assigned time periods. Each operator can therefore use any TDD configuration, which is suited to its traffic demand, during its the assigned, or allocated, time periods.

Figure 9:
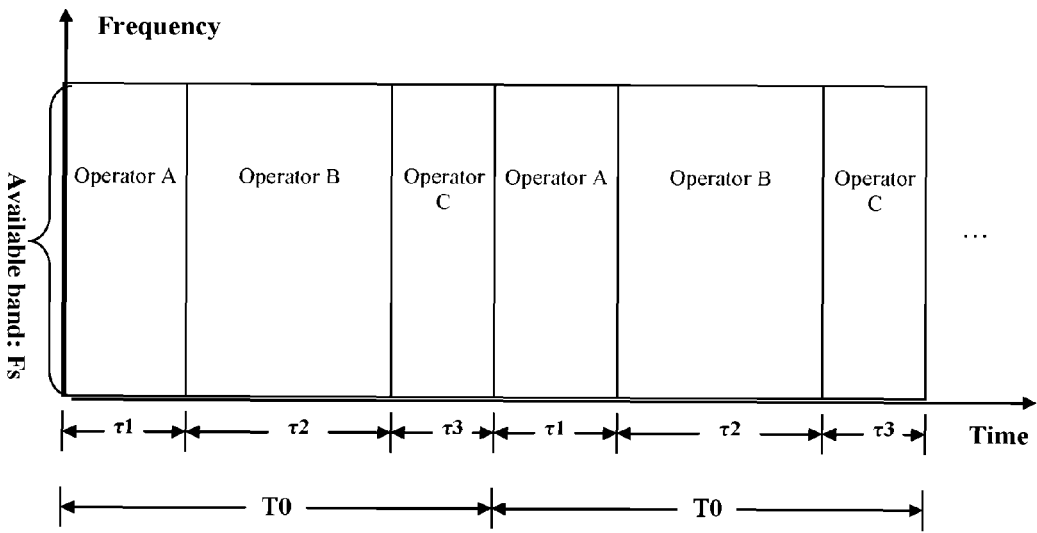
FIG. 9 shows another time sharing example, where an entire, or same, available spectrum Fs shared by operators for TDD operation in different time slots of differing lengths ($\tau 1$, $\tau 2$, $\tau 3$)

The time periods assigned to operators can be equal in length as illustrated in FIG. 8 or, alternatively, unequal in length as illustrated in FIG. 9. The operators A, B and C can use the full spectrum Fs over time periods $\tau 1$, $\tau 2$ and $\tau 3$, respectively, during an aggregated duration of T0.

During the assigned time period, the operator's radio node may be required to switch ON its receiver and transmitter during the DL and UL subframes respectively or during a special subframe in TDD. Similarly, the operators' radio nodes during their unassigned time periods may be required to switch OFF their transceivers to prevent interference to the allowed operators. Thus, an inter-operator guard time (or simply guard time) between the time periods assigned to different operators may be specified to avoid interference or signal disruption.

Figure 10:
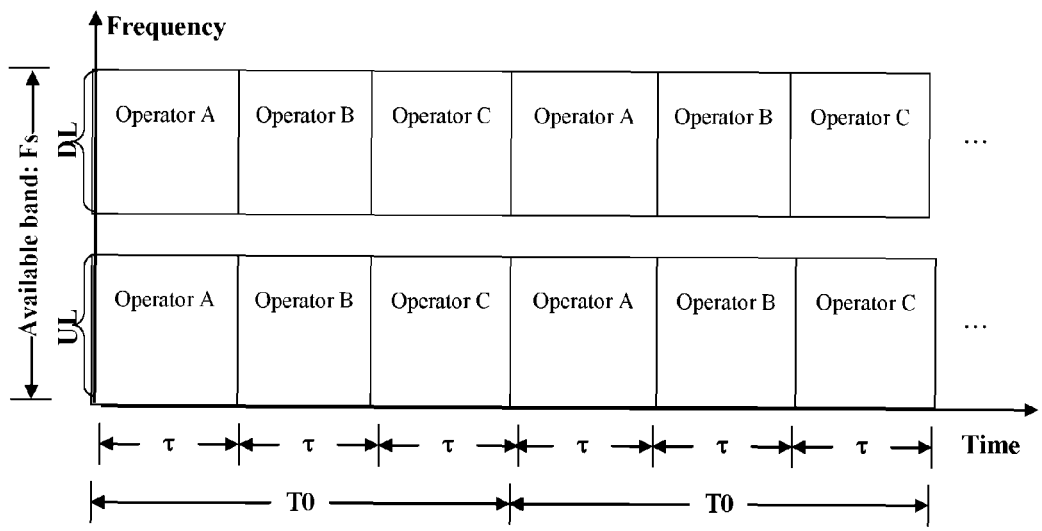
FIG. 10 shows still another time sharing example—an available spectrum Fs is shared by operators for FDD operation in different time slots of equal length ($\tau$)

An example time sharing in FDD is illustrated in FIG. 10. The available spectrum Fs is split into two parts for UL and DL transmissions. In this example, each operator (i.e., its radio nodes and wireless devices) can use the entire UL and DL parts of the shared spectrum Fs over a time period $\tau$, which like in the TDD examples, also occurs periodically once every T0. While not shown, spectrum Fs can also be assigned for unequal time periods (e.g., over $\tau 1$, $\tau 2$ and $\tau 3$ for operators A, B and C respectively).

As will be appreciated, the time sharing principle can be applied on the UL frequencies, on the DL frequencies, or on both. The time sharing may also be combined with half duplex operation. For example, during the assigned time period, the network can use half duplex meaning that the UL and DL transmissions take place on different frequencies but not simultaneously.

In another aspect, different time periods can be allocated for DL and UL frequencies of the same band to different operators. For example operators A, B and C can be the assigned time period $\tau 1\_ul$, $\tau 2\_ul$ and $\tau 3\_ul$ respectively for the UL spectrum and $\tau 4\_dl$, $\tau 5\_dl$ and $\tau 6\_dl$ for the DL spectrum.

Guard times between the time periods assigned to different operators can be used to avoid interference or signal disruption due to transition between switching ON and OFF of the radio transceiver is also applicable to FDD or HD-FDD systems.

Network nodes and wireless devices involved in radio communication can acquire the relevant information (e.g., values of parameters) related to the time shared radio spectrum Fs and use them to perform radio communication between the network and the wireless devices.

In short, during an aggregated duration over which the spectrum is shared between at least two operators, each operator may have at least one assigned time period and at least one unassigned time period. For example, in FIG. 9, operator A may perform radio communication over its assigned time period (T1) but does not perform any radio communication over its unassigned time periods (T2 and T3).

The following list includes some of the basic parameters that should, or could, be acquired to enable inter-operator time sharing of radio spectrum:

Radio spectrum Fs to be time shared between at least two operators:
  E.g., predefined band indicator or number, carrier frequency numbers or radio channels (e.g., ARFCN). For example, it can be predefined that a particular band with a certain band indicator and/or channel numbers can be operated using time sharing of Fs. A band indicator and ARFCN are typically unique. As an illustration, if the existing TDD band 38 (2.6

MHz) is standardized for use as "a time shared band" in future, then new band indicator (e.g., band 50) and new ARFNC ranges will be defined. Therefore new predefined band indicator and/or set of ARFCNs will enable the radio node and/or the wireless device to recognize a band which uses time sharing of the radio spectrum.

Time periods $T_i$ assigned to operator i, where i≥2:
  $T_i$ can be integer multiple of radio frames;
  $T_i$ can be expressed percentage allocation e.g., 33.3% of time assigned to each of the 3 operators;
  Details of their usage may be up to the operators.

Periodicity of occurrence T0 of the assigned time periods $T_i$;

A cell identifier associated with radio communication during an the assigned time period, which can distinguish between different operators sharing the same spectrum. Existing cell identifier could be used.

Examples of existing cell identifiers include, among others, physical cell identifier (PCI), cell global identifier (CGI), and scrambling codes. The PCI are limited and are therefore reused (504 PCIs available in LTE, 512 in HSPA). The PCIs are transmitted in physical signals like synchronization signals and cell specific reference signals, i.e., in physical layer. The CGI is unique in the entire network, but are transmitted in a higher layer signaling, and thus may require reading of master information blocks (MIB) and system information blocks (SIBs).

A cell can be uniquely identified by a cell identifier and frequency. To distinguish signals from different operators using the same frequency (as in time sharing of Fs), at least one type of cell identifiers (e.g., PCI) during the assigned time periods should be unique. For example during $\tau 1$, $\tau 2$ and $\tau 3$, the operators A, B and C may use PCI1, PCI2 and PCI3, respectively. In this way, the wireless device during initial access or during cell identification can distinguish between the signals from different operators.

The following list includes some additional parameters that could be acquired to enable or further enhance the inter-operator time sharing of Fs:
  Number of consecutive radio frames within a time period assigned to each operator—can be the same or different for different operators;
  Inter-operator guard time to account for transition due to switching between transceiver ON and OFF when changing between time periods belonging to different operators (e.g., 100-500 μs);
  A pattern of the assigned time periods to different operators—the pattern can comprise one or more of the following parameters:
    Whether pattern is periodic or aperiodic;
    Number of time periods assigned to different operators during the pattern;
    Pattern length:
      Should be at least a sum of the number of time periods assigned to different operators;
      If specified, account for guard times;
    Pattern periodicity after which it repeats
      In case of periodic pattern, should be equal to the pattern length;
    Starting reference time of the pattern (e.g., SFN, absolute time, a time obtained from a global reference clock (e.g., GNSS));
    Duration over which the pattern is applicable (e.g., infinity, one hour, several periods, several frames);
  TDD configuration (UL/DL and/or S subframe configuration) for each operator in each time period—applicable to TDD operation.
  Number and identifiers of UL and/or DL subframes used in a frame in case of HD-FDD operation—applicable to HS-FDD operation.

The time sharing parameters may be associated with each radio spectrum (i.e., frequency bands). This means that some parameters may be different for different bands. However, some or all the parameters may be common for certain bands e.g., bands in certain frequency ranges such as between 2-2.5 GHz. The parameter values may also depend upon the duplex mode (TDD, FDD, HD-FDD, DL FDD, etc.)

Adapting RRM Procedures—Network Node

A network node (including radio node) intending to use the radio spectrum for radio communication may acquire information related to time sharing of the shared spectrum Fs. The network may adapt at least one RRM related procedure based on the time share related information.

The network node can acquire the time sharing related information (e.g., basic and optionally additional parameters) based on one or both of the following:
  Predefined rule; and
  A configuration performed by a configuring network node.

In one aspect, some or all parameters may be predefined in the network node. For example, at least some of the basic parameters (e.g., time periods, percentage of time assigned to each operator, periodicity, inter-operator guard time and so on) can be predefined. This can be done at the time of assigning the spectrum to operators, e.g. when initiated by regulators.

The predefined assignment can also be revised over time in case new operators who want to access the same radio spectrum are introduced or the existing operators want to change their allocated time periods or if the spectrum is modified. The predefined time sharing information can be stored in the network nodes in accordance with the predefined rules.

In another aspect, the network node may acquire the necessary time sharing information from another network node, i.e., a configuring node. Configuring node examples include OSS, O&M or SON nodes. The configuring node may configure the network nodes (e.g., eNB, NodeB, RNC) with the required time sharing parameters associated with a particular radio spectrum or a frequency band. In yet another example, network node such as core network node or a radio node (e.g., RNC or BSC) may configure another radio node with the time sharing related parameters.

The configuring node may determine the values of the parameters based on predefined or stored information. The information can be modified over time in case one or more parameters change over time, spectrum is reframed or modified, new operators acquire the spectrum or the existing operators relinquish their spectrum, etc. Alternatively, or additionally, the parameter values can be determined based on input received from other operators e.g., via their respective configuring nodes.

The configuring node can be distributed i.e., be unique for each operator. Alternatively all or group of operators may share the same configuring node for configuring the time sharing parameters associated with one or more radio spectrum or bands. The latter approach would simplify coordination between operators.

In yet another aspect, principles described above can be combined by the network node to acquire the necessary, or otherwise important or relevant, time sharing related parameters. In one example, the basic parameters (e.g., time periods or percentage allocation of spectrum) may be acquired based on predefined information, and additional parameters may be acquired from the configuring node or any other network node.

The network node can adapt one or more RRM related procedures and/or one or more configuration parameters in the network to enable a wireless device to adequately execute RRM procedures such as performing measurements, receive scheduling, and so on.

The network node adaption can be based on, be affected by, and/or triggered by the obtained (or acquired) time share related information. The adaption accounts for the assigned time periods (during which radio communication is performed) and unassigned time periods during which no radio communication is not performed. This may ensure that the wireless device performance requirement is met or at least wireless device measurements or corresponding procedures don't fail due to signal interruption during the unassigned time periods in the network node. Examples of the adaptation of one or more configuration parameters and/or procedures related to RRM performed by the network node include:

Adapting frame numbering related parameters;
Adapting measurement configuration parameters;
Adapting scheduling of data;
Adapting measurement requests;
Adapting random access parameters;
Adapting power control parameters;
Saving power consumption by turning off;
Adapting parameters enabling other system operation in unassigned time periods;
Adapting parameters for enabling heterogeneous operation.

A frame number is a parameter which indicates the frame number of a current frame and is generally signaled by the network to the wireless device in a broadcast message or channel and/or in a wireless device specific channel such as PDSCH in LTE. A frame counter initializes after a predefined number of frames. Different procedures are associated with or start at designed frame numbers. For example, the network may inform the wireless device that random access is allowed only in odd frames or in a frame with modulo 4, etc. The wireless device can use the frame counter to obtain a reference time or to determine the frame(s) in which certain procedures are allowed (or not allowed). Example frame counters include SFN (system frame number) and CFN (connection frame number). In LTE, the SFN initializes after 1024 frames i.e sent by the network using 10 bits ($2^{10}$=1024). The SFN is cell specific whereas CFN is wireless device specific.

Figure 11:
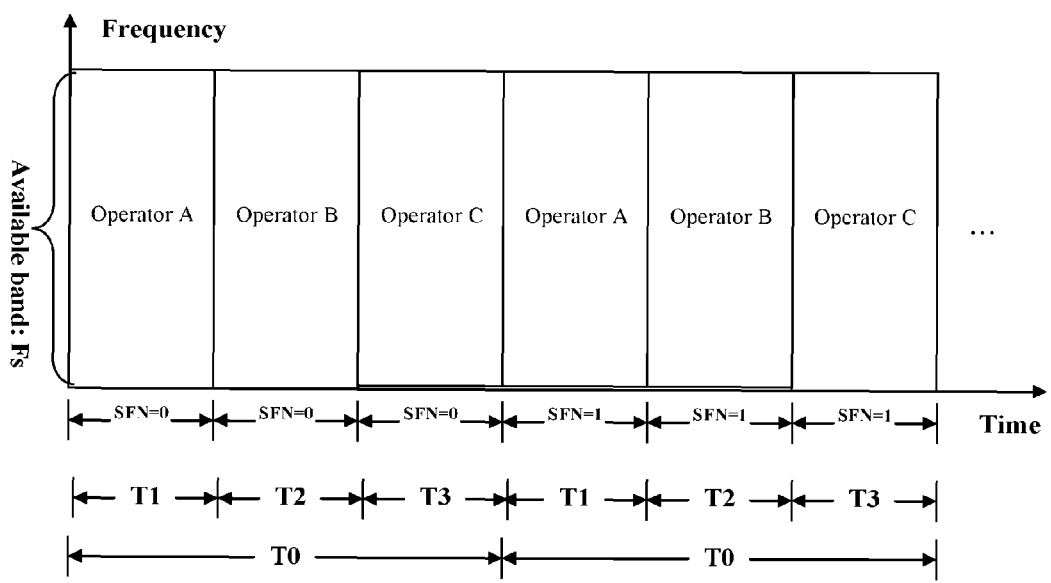
FIG. 11 shows an example adaptation to indicate frame number only during an assigned time period(s)

According to one aspect, the network node can adapt the frame number related parameters such that the signaled parameter indicates the actual frame transmitted during the allocated time period to a cell belonging to an operator. To illustrate this embodiment assume each of the three operators' assigned time period is equal to one radio frame. FIG. 11 shows an example adaptation aspect in which the frame number (SFN in this example) transmitted by the network node is transmitted only during the assigned time period.

In another aspect, the network node may signal two frame numbers related to parameters, where one represents frames only during the assigned time period and another represents frames during assigned and unassigned time periods. The former can may be referred to as an effective frame number (e.g., effective SFN (ESFN)), and the latter may be referred to as an overall frame number (e.g., overall SFN (OSFN)).

Figure 12:
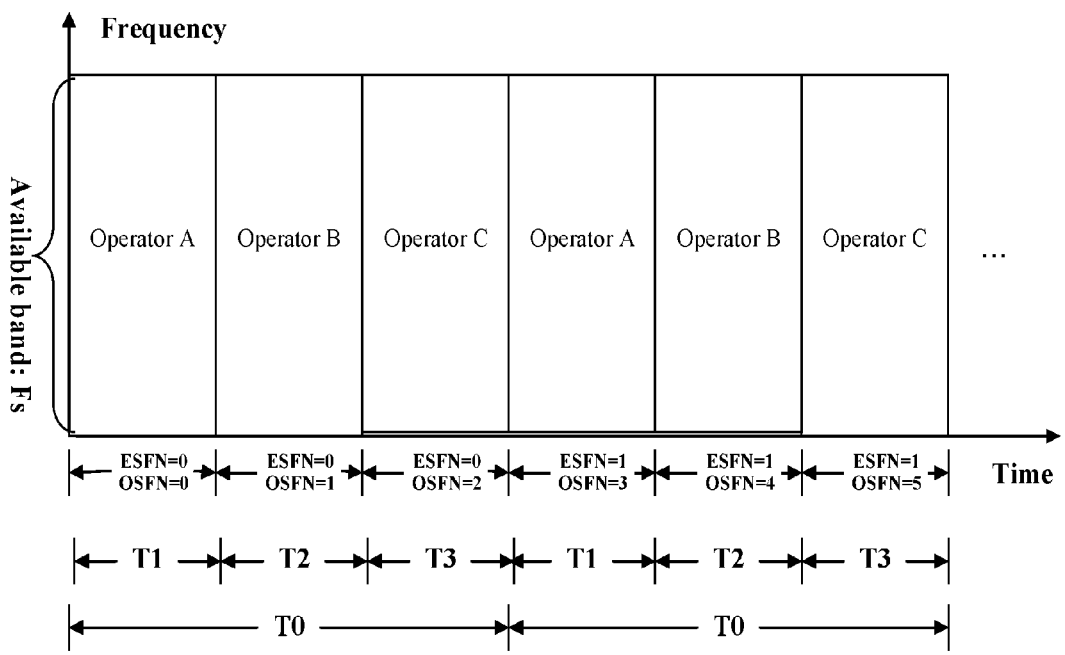
FIG. 12 shows an example adaptation to indicate effective and overall frame numbers.

FIG. 12 shows an example adaptation in which the network node signals two frame numbers—the effective SFN (or simply SFN) and the overall SFN. To signal overall frame number, the network node uses the obtained, thus acquired, information related to the time periods assigned to all other operators sharing the same radio spectrum in time as used by the network node.

ESFN can be signaled to the wireless device in the system information of each cell for the cell itself. The OSFN for neighbor cells can be signaled to the wireless device by its serving cell. The OSFN can also be derived from a predefined expression whose one or more parameter can be signaled by the network. For example the OSFN and ESFN can be related by an offset and number of the assigned time periods to each operator sharing the radio spectrum in time.

Part of the system information (e.g. MIB, SIBs) can be signaled in predefined frame numbers. For example in LTE, the MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. The SIB1 uses a fixed schedule with a periodicity of 80 ms and repetitions made within 80 ms. The first transmission of SIB1 is scheduled in subframe #5 of radio frames for which the SFN mod 8=0, and repetitions are scheduled in subframe #5 of all other radio frames for which SFN mod 2=0.

In case of time sharing of radio spectrum, the existing MIB and SIB1 scheduling used in LTE (as explained above) can also be reused. However instead of SFN, their scheduling can to be done according to ESFN.

In an aspect, the network node sending the measurement configuration to the wireless device for performing one or more measurements may adapt or adjust one or more measurement related parameters. The adaptation of the parameter(s) may be based on the duration and/or proportions of assigned and unassigned time periods in the cells to be measured, type of measurement, purpose of measurement, type of signals used for measurement, measurement sampling intensity, measurement requirements (e.g. measurement period or evaluation period, measurement accuracy), and so on. Examples of adaptation of measurement related parameters are given below:

In one example, if the assigned time period is below a threshold and/or ratio (or proportion) of the assigned to unassigned time periods is below a threshold in the serving cell (e.g. PCell) or in a cell whose radio link is monitored by the wireless device, then the network node may adjust the higher layer filtering parameters associated with the relevant measurement(s). The higher layer filtering parameters may be configured at the wireless device by the network.

Consider radio link monitoring (e.g., out of sync and in sync evaluations, triggering of radio link failure) being performed by the wireless device on the serving cell whose DL signal is interrupted over 20 ms in a period of 30 ms, that is, the assigned and unassigned time period are 10 ms and 20 ms respectively. In this instance, the network may configure higher layer filtering parameters such as hysteresis counters and/or radio link failure timer to values to be different than those used in the normal or usual scenario. Examples of hysteresis counters include out of sync counter (N310) and in sync counter (N311) used in LTE. An example of a RLF timer is T310 used in LTE.

As an illustration, the network can set N310 to 10 and T310 to 2 seconds; these settings are longer than usual. The longer values can ensure that the wireless device does not generate or lead to excessive OOS and RLF. The N311 timer on the other hand can be set to a small value such as from 1 to 3. This can ensure that the wireless device quickly recovers from the RLF state when timer T310 is running. With specific settings of higher layer filtering parameters, the radio link monitoring operation in the wireless device may be refrained from triggering radio link failure, and consequently the RRC connection re-establishment to a new cell when the serving cell signal is not available during the unassigned time periods.

In another example, due to the unassigned time period (i.e. when there is no radio communication) there can be a signal interruption in the cell to be measured. To account for this scenario, the network node may adapt, adjust or set parameters such as layer 3 filtering coefficient, time to trigger, measurement BW, signal hysteresis, thresholds related to measurement events or the like used by the wireless device for performing measurement. The measurements stated above can be intra-frequency, inter-frequency or inter-RAT. The measurements may be performed by the wireless device or network node on signals sent by the wireless device or on signals sent by another radio node (e.g. home BS measuring on macro BS or on another home BS). These parameters may be configured by the network node by sending the measurement configuration requests to the wireless device.

In yet another example, a positioning node may adapt or adjust positioning related parameters which are signaled to the wireless device or to any target device whose position is to be determined. The wireless device may use these parameters for positioning related procedures such as for performing positioning measurements, and determining its position. The adaptation of parameters may include one or more of: use of larger PRS bandwidth for measuring RSTD measurement, use of larger measurement bandwidth for measuring positioning measurement in general (e.g. wireless device Rx-Tx time difference measurement, etc), for RSTD selecting a reference cell where there the available radio time for measurements is longer (i.e., the assigned time period is longer than a threshold e.g. at least 2 consecutive radio frames in each the assigned time period). The reference cell is important since it is used in each RSTD. The adaptation therefore ensures that all or at least large number of the consecutive PRS subframes (e.g., up to 6 DL subframes) in a positioning occasion are available to the wireless device for performing the PRS measurements. This in turn may improve positioning measurement performance and enhanced positioning accuracy.

In a further example, the network may adjust the parameters related to the wireless device activity level when the wireless device is required to perform measurement(s) and/or to receive data and/or to transmit data. For example, the network may change the wireless device's discontinuous reception (DRX) and/or discontinuous transmission (DTX) cycle. The modification of the DRX and/or DRX may lead to more flexibility for performing wireless device and/or radio network node measurements.

The network may shorten the DRX cycle when the wireless device performs certain specific measurements. As a result, the wireless device may perform more frequent sampling of signals sent by the radio node and avoid or minimize the impact of the absence of signals during the unassigned time periods. The wireless device in this way can obtain all necessary measurement samples within the desired or predefined measurement period. The wireless device can thus perform measurement without or with less deterioration of measurement accuracy. The wireless device can also report the measurement results to the network within the required time or within an acceptable delay.

Similarly, the shortening of the DTX cycle of the wireless device will enable the radio node to perform more frequent measurement sampling of uplink signals. As a result, measurement performance will be met or met with an acceptable level even if the assigned time period is relatively short as compared to unassigned time period. Adapting the wireless device DTX cycle the radio network node or any other measuring node (e.g. base station, LMU, etc) may receive more dense UL signal transmissions from the wireless device. This in turn will enable the network node to more effectively perform uplink measurements such as propagation delay between wireless device and itself, BS Rx-Tx time difference measurement, time of arrival measurements, and so on, and thus meet the corresponding requirements thereby improving overall measurement performance.

In yet further example, the network node may configure the wireless device to perform critical, or otherwise important or relevant, measurements such as positioning measurements (e.g. OTDOA, RSTD) on another frequency operating on a band which is not time shared (e.g., legacy band). This can be used if the wireless device cannot meet the predefined requirements or can only meet less stringent requirements when measuring on cells operating on the time shared radio spectrum.

In an aspect, the network node scheduling data to the wireless device may adapt the scheduling to compensate for not being able to schedule data during the unassigned time periods. The radio node may schedule more data to the wireless devices with stringent quality of service requirement prior to and/or after the unassigned time periods The adaptation of scheduling may also depend upon the characteristics of assigned and/or unassigned time periods such as their length and their relative proportion. The network may use s transport format which can carry more user data during the assigned time periods, e.g., by using higher order modulation and/or lower code rate. The network may also use larger bandwidth or larger number of resource blocks for scheduling the transmission of data to the wireless device in the DL and/or by the wireless device in the UL.

For certain time critical services like voice over IP (VOIP), the network node may schedule several concatenated packets to the wireless device for DL and/or UL transmissions during the assigned time periods.

Since data cannot generally be scheduled during the interrupted periods, the buffer in the radio node may overflow. Thus, the flow control of data between a radio node and a higher network node may also be adjusted to avoid overwhelming of buffer in radio node during the unassigned time periods. For example, the eNB can request the core network (or Node B can indicate to the RNC) to limit or avoid sending data over a certain amount (e.g. data amount) towards the eNB during or close to the unassigned time periods.

In an aspect, the network node may include or exclude cells in a measurement configuration message sent to the wireless device for performing measurements while taking into account the assigned time periods. The network node may exclude cells whose the assigned time period is very short e.g. only 1 frame or cell whose periodicity of occurrence of the assigned time period is very long e.g., 100 ms or longer.

Another possibility is that the network does not send any measurement request to the wireless device for performing certain types of measurements for such cells. For example, the network may refrain from requesting the wireless device to read the SI of the target cell if the assigned time period is too short. The target cell can be intra-frequency, inter-frequency or inter-RAT. The network may request the wireless device to read the SI of the target cell between the successive unassigned time periods, i.e. during time when the BS operates in a normal way (receives and/or transmits all signals). In another example, the network may request the wireless device to perform measurements (e.g. inter-frequency, inter-RAT measurements) on cells operating on non-serving carriers during the unassigned time periods. This may avoid the need for causing any interruption or creating any types of gaps on the serving cell (i.e. on serving carrier).

This means the first network node may adapt the signaling of measurement request messages to the wireless device while taking into account aspects such as characteristic of the assigned and unassigned time periods in the target cell to be measured, measurement requirements of the request measurement, type of measurement, etc. The measurement requirement to be considered can be related to the measurement period or evaluation period over which the measurement is to be done.

The network node may additionally, or alternatively, adapt one or more parameters related to random access transmission to ensure that the wireless device is able to send random access messages and receive random access responses (RAR) from the network during the assigned time period. This may require the network to signal the random access configuration parameters to the wireless device such that random access and corresponding responses can take place during the assigned time periods.

For example, a RAR window size can be chosen such that the RAR can be sent within the assigned time period. More specifically, the random access occasion (e.g. frame in which RA takes place) may be configured by the network node in those frames which belong to or overlap with the assigned time periods. Similarly, the RAR window may be configured by the network node in those frames which belong to or overlap with the assigned time periods. The configured parameters may be signaled to the wireless device via system information (e.g. SIBs) or via wireless device specific channel e.g. PDSCH in LTE.

The network node may adapt one or more parameters related to UL power control procedures performed by the wireless device on one or more UL channels e.g. SRS, PUCCH, PUSCH, RACH, etc. Examples of power control related parameters that can be adapted include power control command size such as sending to the wireless device a larger TPC size immediately after the unassigned time period is over or during the N initial subframes during the assigned time period. Another example adaptation may include setting a more aggressive, e.g. higher received signal quality, target during the N initial subframes of the assigned time period.

The radio node may turn off its radio receiver and/or transmitter during the unassigned time periods. This will enable the radio node to save its battery power. The receiver and/or the transmitter may be turned off regardless of the number of users served by the radio node.

The radio node may also turn off its baseband unit during unassigned time periods. Alternatively it may use its baseband unit to process data previously received from the wireless device in earlier assigned time period(s) and/or will be transmitted to the wireless device in the next the assigned time period(s).

The network node (e.g., radio node, core network node, SON node, O&M node, OSS node, etc) may adapt one or more parameters related to the assigned and unassigned time periods to enable or facilitate the wireless device to use the unassigned time periods for operating radio communication systems other than those used during the assigned time periods. In case the wireless device wants to use the unassigned time periods for one or more other radio communication systems, the network node may assign unassigned time periods larger than a threshold or a reference time periods. The network node may also determine the proportion between the assigned and unassigned time periods in a cell or in multiple cells or in part of the network based on results or statistics related to the use of unassigned time periods by plurality of wireless devices. For example, if a large number of the wireless devices (e.g. more than 50%) in a cell or in part of network use unassigned time periods for other systems, then the network node may assign unassigned time periods larger than a threshold or a reference time period in a cell or in part of the network where these devices typically operate.

The network node may also adapt parameters associated with radio measurements (e.g. signal strengths) related to the other radio communications performed by the wireless devices during the unassigned time periods. If the wireless device is to perform several measurements, then the network node may provide more details related to the cells (e,g cell IDs, cells' frame timing related to a reference time) on which the wireless device will perform the radio measurements. This may enable the wireless device to perform the measurement more quickly and with better measurement accuracy.

Examples of other radio communication systems that can operate during the unassigned time periods include, but are not limited to, multi-RAT operation, in-device operation co-existence operation, and multi-SIM operation. Some of these examples are elaborated below.

The network node may adapt one or more parameters related to the assigned and unassigned time periods to enable and facilitate the wireless device to operate over multiple bands and/or RATs without interrupting or losing data on any of the RAT and/or band. For example, the assigned and unassigned time periods can be configured by the network node so that the wireless device can operate with multiple RATs during the assigned period (e.g. RAT1 such as LTE for guaranteed service or data rate) and the unassigned time period (e.g. RAT2 such as GSM for best effort service or data or for measurements).

The wireless device typically sends requests to the network when it encounters in-device co-existence problem or wants to use in-device external wireless systems (e.g. WLAN, etc). Conventionally, the network node in response configures the wireless device to create autonomous gaps (aka cellular idle time) in which wireless device is not allowed to operate on cellular system (e.g. band 40). The wireless device during these gaps can operate any of the in-device external wireless systems (e.g. WLAN, etc). The network can also configure a pattern of subframes or time instances which can be shared between cellular and in-device external wireless systems.

However, in an aspect of the disclosed subject matter and in response to the received wireless device request from the wireless device, the network may take into account the unassigned time periods when configuring wireless device with a scheme to enable in-device co-existence operation e.g. configuring wireless device with autonomous gaps, with a pattern of time periods to share between cellular and in-device external wireless systems, etc. For example, if the unassigned time periods is longer than a threshold (e.g. at least 20 ms at least every 50 ms), then the network node may assign fewer resources (e.g. subframes) for wireless device with autonomous gaps to enable operation for in-device external wireless systems. The wireless device can use the unassigned time periods for the in-device external wireless systems.

The network node may determine whether or not a wireless device supports multi-SIM operation. The network node may also determine whether or not a multi-SIM capable wireless device is currently using or intends to use multi-SIM operation within a certain time. The network may determine that the wireless device is using or intends to use when the wireless device informs the network that it wants to establish multi-SIM operation or seeks permission to do so. The wireless device may also indicate to the network its capability in terms of supported multi-SIM operation. The network may also determine wireless device multi-SIM operational capability and/or its current multi-SIM operation based on information received from another network node e.g. from network node such as core network node (e.g. MME) of another PLMN which is involved in multi-SIM operation for this wireless device.

The network, in response to the determined multi-SIM operational capability and/or current multi-SIM operation of the wireless device, may take into account the unassigned time periods and/or the assigned time periods when permitting the wireless device to perform the multi-SIM operation or configuring the wireless device with a scheme or resources to enable multi-SIM operation. For example, if the unassigned time period is longer than a threshold (e.g. at least 20 ms at least every 50 ms), then the network node may assign fewer resources (e.g. subframes) for wireless device with gaps to enable multi-SIM operation. In this case, the wireless device can use the assigned time period for the radio communication related to the PLMN of a first SIM. The unassigned time periods can be used by the wireless device for the radio communication(s) related to the PLMN of the second or subset or remaining SIMs. In this way, the wireless device can operate using multiple SIMs with different PLMNs without degrading performance since interruptions due to measurements and/or emissions across carriers can be avoided.

The radio communication herein refers to any type of procedure related to cellular communication including, but not limited to, data reception, data transmission, UL and/or DL radio measurements, reception of paging, sending random access, initiating or terminating a cell and/or session, sending measurement results, sending or receiving requests related to a radio procedure such as cell change, performing cell update or tracking area update.

In a LTE heterogeneous network, one or more transmit signal patterns may be configured in an aggressor node (e.g. macro eNB) to protect a signal received by a victim wireless device. The victim wireless device may be configured with one or more measurement patterns (e.g., a resource restriction pattern) for performing measurements on victim cells. A transmit pattern may also be referred to as a low interference time frequency pattern or an ABS pattern, which overlaps with the measurements patterns. This principle is also interchangeably called as eICIC.

In one aspect, the network node configuring one or more signal patterns (e.g. transmit signal patterns and/or measurement patterns) used in a heterogeneous network operation may configure the patterns by adapting one or more parameters related to the patterns. One purpose of adaption of the parameters is to ensure that sufficient amount of protected resources are available in a pattern enabling the wireless device to perform measurements. This in turn enables the wireless device to meet the predefined requirements related to measurements and/or receiving/transmitting data in the heterogeneous network. The adaption of the parameters may be performed by the network node while taking into account one or more of the following:

the assigned time periods;
proportion of assigned and unassigned time periods;
frequency of occurrence of each the assigned time period.

For example, the aggressor node may configure a denser transmit signal pattern (e.g. 2-3 subframes per radio frame) when the assigned time period is smaller than a threshold (e.g. 30 ms) and/or if it occurs less frequently (e.g. less than every 80 ms).

Some or all of the disclosed aspects are applicable to any type of pattern based measurements including measurements that are performed by any wireless device in indicated time-frequency resources.

Adapting RRM Procedures—Wireless Device

A wireless device intending to use the radio spectrum for radio communication may acquire information related to time sharing of the shared spectrum Fs. The wireless device may adapt at least one RRM related procedure based on the time share related information. The wireless device can acquire the time sharing related information (e.g., basic and additional parameters) based on any combination of the following:

Predefined information;
Information received from a network node;
Information received from another wireless device.

Some or all parameters may be predefined in the wireless device. More realistically however, a wireless device capable of supporting time sharing of radio spectrum (e.g., band X) may store some minimum information related to time sharing. The stored predefined information can include, among others, band indicator, number of operators sharing spectrum, part of spectrum or its ARFNC ranges to be shared among operators in time, time allocation or time period assigned to each operator.

The wireless device may also acquire from the predefined information that each operator uses at least one full radio frame during its the assigned time period or that the time period for each operator includes at least one radio frame. The wireless device may also determine from the predefined information that each operator uses at least one type of distinct cell identifier (e.g., different PCI) in their respective allocated time period in their network or at least in the same geographical area or region or in a coverage area. A physical size of an area in which a particular cell identifier is to be unique among operators may also be predefined.

The distinct cell identifier enables the wireless device to distinguish between different operators at least during initial access, cell identification or prior to starting the radio communication with the network. In order to ensure flexibility, the exact cell identifier such as PCI to be used in order to distinguish signals from different operators may not be predefined.

The wireless device may store the predefined information in memory in the wireless device or otherwise easily accessible such as on a SIM, USIM. Preferably, the memory can be easily overwritten by an operator or subscriber or through an application program downloaded via a computer. This approach of using SIM card or any rewritable memory is particularly flexible to operators as it enables them to change their time allocation in future due to change in their traffic demand or due to other reasons such as the inclusion of new operators, the existing ones quitting the band allocation or assigning their allocation to other operators.

Alternatively, the network node can signal time sharing related information and parameters for each radio spectrum or band described above to the wireless device. The information can be signaled on cell specific channel (e.g., broadcast information such as in MIB and SIBs) for the wireless device in low activity state (e.g., idle state, URA_PCH, CELL_PCH, CELL_FACH states). The time sharing information can also signaled over a specific channel (e.g., dedicated control channel (DCCH)) to the wireless in the connected state. The DCCH can be transmitted over a shared channel such as PDSCH in LTE.

The network may signal the time sharing information related to the radio spectrum or frequency band used for conveying this information as well as of other time shared frequency bands. The wireless device capable of multiple time shared frequency bands can therefore acquire time sharing information related to one or plurality of its supported time shared frequency bands. In one embodiment, certain specific parameters or all basic parameters, some of which can be initially predefined, may also be signaled by the network e.g., number of operators sharing spectrum. This may facilitate neighbor cell identification of cells on bands for which wireless device may not have updated predefined information.

A subset of time sharing parameters may be specific to a cell or group of cells. In other words, the values of certain parameters may be different depending upon the coverage area. For example consider a scenario in which three operators A, B and C agree on different time allocation in different sites but overall their share is the same e.g., equal split or 33.33% in time on average. In another example, the same operator may use different TDD configuration in different cells during its allocated time period for a particular band.

The inter-operator guard time may be different in different cells or in different coverage areas. Therefore a cell (e.g., a serving cell or a reference cell) may also signal to the wireless device at least certain time sharing parameters for neighboring cells. The neighbor cells whose time sharing related information is signaled may belong to the intra-frequency spectrum or band (i.e., same frequency as that of the serving cell), inter-frequency or even inter-RAT spectrum or band. The wireless device may acquire certain remaining information from another wireless device in case it is device-to-device capable.

Also, a wireless device which is capable of communicating with another wireless device through a direct link (e.g., device-to-device communication capable) may acquire the parameters or certain remaining information related to the serving frequency or another frequency from another wireless device. The wireless device which has such information may forward it to another wireless device via a direct 'wireless device'-to-'wireless device' communication link whenever it is established.

The principles described above can be combined by the wireless device to acquire the necessary, or otherwise important or relevant, time sharing related parameters. In one example, the basic parameters (e.g., time periods or percentage allocation of spectrum) may be acquired based on predefined information, and additional parameters may be acquired from the network. The wireless device may even acquire certain remaining information from another wireless device.

As an illustration, the wireless device may use basic predefined information to perform initial cell identification (cell search) of a cell operating on a time shared spectrum and acquire the remaining or additional parameters after camping on or connecting to the identified cell.

Upon obtaining the information or indication related to the time sharing of radio spectrum used in one or more cells (serving and/or in neighbor cells), the wireless device can adapt one or more RRM related procedures. The wireless device may perform tasks taking into account the obtained information. Examples include:

Adapting cell identification;
Determining frame numbering related parameters;
Adapting measurement procedure;
Adapting signal transmissions;
Saving battery power during unassigned time periods;
Adapting measurement types to be performed;
Using other systems during unassigned time periods;
Adapting data processing occasions;
Adapting power control procedure;
Adapting random access procedure;
Adapting timers;
Adapting synchronization;
Predefined rules and/or predefined requirements to enable adaption;
Using adapted parameters;
Informing network node of utility of unassigned time periods.

Conventionally, the wireless device identifies a cell based on a PCI (e.g. scrambling code) and carrier frequency. But in an aspect, a new procedure is disclosed herein whereby the wireless device identifies a cell based on a carrier frequency and the assigned time period. In another aspect, the wireless device may identify a cell based on a carrier frequency, a PCI, and also on the assigned time period. Thus, the wireless device should determine the boundary of the assigned time periods for a cell to be identified.

The serving cell may signal to the wireless device a time offset parameter, which enables the wireless device to determine the time offset between a reference cell and a target cell to be identified. The wireless device may also determine the timing relation between reference and cells to be identified based on a pre-define rule or an expression. A reference cell can be serving cell or any cell whose timing is known to the wireless device. The wireless device may also use a guard time between time periods assigned to different operations to distinguish the frames or transmissions from different operator.

In this procedure, the wireless device may acquire the frequency as well as time synchronization of a cell on a time shared radio spectrum. The wireless device may use pre-defined information (e.g. band number) related to a time shared spectrum or band to determine whether it has to search cells on this band based on legacy principle or based on new principle where a cell belonging to an operator transmits signals only during its the assigned time periods.

The wireless device may use existing signals (e.g. correlating over PSS, SSS, CRS in LTE) for performing an initial cell search. The wireless device may assume that the entire band or spectrum is used in each frame, i.e., whole band is shared between operators in time. The wireless device, however, may not know the center frequency of the carrier. It may therefore search the carrier at all possible center frequencies, which may be predefined for each band. The wireless device may then acquire the carrier frequency symbol, slot, subframe and frame boundary of the cell.

In one example, the assigned time periods to different operators may be predefined for a particular time shared radio spectrum or band. In this case, wireless device can more easily distinguish between cells of different operators when doing a cell search. Consider for example that 4 operators equally share the same radio spectrum in time and each operator is assigned one frame at a time. During an initial cell search, the wireless device has to search all 4 cells, read their system information and determine the cell (e.g. PCI, the assigned time period, etc) belonging to its operator based on the acquired system information. The wireless device may then acquire information about the neighbor cells (e.g. the assigned time period, carriers, bands, etc) from this identified cell and proceed with the neighbor cell search.

When the assigned time periods between the operators are not equally split, the wireless device (during an initial cell search) may identify the time periods belonging to the different operators by using predefined information related to the guard time between the assigned time periods of different operators. For example, during a guard time period the wireless device may detect very low power or noise or unrecognized signals. The guard time information, the assigned time periods, may be signaled to the wireless device by a cell in system information as stated earlier. After reading the system information, the wireless device can therefore uniquely identify the assigned time periods belonging to different cells.

The assigned time periods, number of operators sharing the spectrum and so on for a particular band may not be known to the wireless device prior to initial cell search. For example, none of this information may be predefined for a band; rather it may be signaled to the wireless device by the cell in system information. Even the value of the guard time between time periods of different operators may not be predefined. However it may be predefined whether (or not) there exists a guard time between the assigned time periods.

In this scenario during the initial cell search, the wireless device should correlate signals independently during each frame. This is because operators might be reusing the same PCI but the wireless device does not know which frame belongs to which operator. This can be determined once wireless device knows the mapping between the assigned time periods and different operators after reading the system information. Therefore, during the initial cell search the wireless device should identify cells in each frame and eventually read their system information to determine the assigned time period assigned to each operator.

In exemplary scenarios mentioned above, the wireless device may then identify a cell which is represented by a carrier frequency (e.g. ARFNC of center frequency of the carrier), PCI (e.g. scrambling code) and information related to the assigned time period. The information related to the assigned time period may be expressed in terms of an identifier assigned to an operator which maps to its the assigned time period or may represent the assigned time periods to each operator. This identifier can be predefined or can be temporarily assigned and signaled in system information. It may also represent the sequence of the assigned time periods in a cycle during which all operators share the spectrum in time. For example, for the four operators the identifier can be expressed in terms of 2 bits (0, 1, 2 and 3). In this example '00' may represent the cell belonging to first operator or cell during the first the assigned time period in a cycle and so on.

The wireless device, when reporting the measurement results (e.g. cell identity, measurement quality (e.g. RSRP, RSRQ, etc) to the network, may also include (in the report) the identifier of an operator or of the assigned time period in addition to carrier frequency, PCI and measurement results. This will enable the wireless device and network to distinguish the measurement results obtained on different the assigned time periods of different operators.

The wireless device may use information obtained from the serving cell or "camped on"-cell which is identified during the initial cell search for performing neighbor cell search. The neighbor cells may belong to the carrier of the serving or camped on cell or of another carrier or RAT.

For example, the wireless device may read the system information of the initially identified cell to obtain information about the neighbor cells. The obtained information may include information about the assigned time periods to different operators on a time shared carrier, inter-operator guard time, and additional parameters as described above. The wireless device may use the obtained information and search for neighbor cells using the same principle as described previously.

The identified neighbor cells may then be used by the wireless device for one or more RRM tasks. For example, the wireless device may reselect to one of the neighbor cells and/or it may report results to the network. The reported results may include all the information described above (e.g. ARFCN of carrier frequency, PCI, identifier of an operator or the assigned time period in a cycle over which all operators share the spectrum/carrier in time, etc).

The wireless device may acquire the adapted frame number related parameters from the cell and interpret their meaning based on predetermined rules. The wireless device can determine the ESFN and OSFN for each frame. The wireless device may acquire this information by reading the system information of a cell e.g. PBCH in LTE. The serving cell may also signal this information for the neighboring cells to the wireless device.

The wireless device may use the acquired adapted frame number related parameters for determining frame number and perform a specific task. For example the wireless device can determine the frame numbers (e.g. every even frame as configured by the network) in which the wireless device is allowed to send random access. In another example, the wireless device can determine the frame numbers in which the wireless device should read certain SIB e.g. SIB1 in every frame SFN modulo 2=0 which may be configured by the network.

The wireless device may adapt one or more procedures related to the radio measurements (e.g. cell search, signal measurements, RLM, positioning measurements, etc). An adaption of measurement procedure herein refers to modification or changing of any parameters related to or involved in a radio measurement performed by the wireless device. Examples of such parameters include measurement sampling rate or frequency, size of coherent and/or non-coherent measurement sample in time and/or frequency, sample location in time and/or frequency, etc.

According to one example of adaption of a measurement procedure, the wireless device performing measurements on cells belonging to the serving carrier frequency or on carrier frequencies which operate during the assigned time periods, may only sample or obtain signals for measurements during the assigned time period. That is, the wireless device (for measuring these cells) may refrain from measurement sampling during the unassigned time period. In one specific example, the wireless device does not perform radio link monitoring related tasks, e.g., downlink radio link quality estimation, evaluation of out of sync (OOS) and in sync (IS), during the unassigned time period; rather it performs them only during the assigned time periods.

The wireless device may adapt the measurement sampling to account for the reduced available radio time during which valid measurement samples can be obtained to perform reliable measurements, i.e., during the assigned time periods.

The adaptation of the measurement sampling by the wireless device will enable the wireless device to meet the predefined requirements related to the performed measurements. Without adaptation, the wireless device may fail to perform the measurements or it may not meet the predefined requirements related to the measurements when measuring on cells belonging to time shared radio spectrum. This may lead to inadequate operation of procedures relying on such measurements such as mobility procedure and positioning.

Examples of predefined requirements include measurement period, cell identification time, evaluation period, measurement accuracy, signal level and/or signal quality thresholds down to which the wireless device has to meet the predefined requirements, number of cells on a carrier for which the wireless device can perform certain measurement during a measurement period, number of carrier frequencies for which the wireless device can perform certain measurement during a measurement period, etc.

A more frequent measurement sampling can be realized by one or more predefined rules. The predefined rules may also be applicable for certain measurements, e.g. for critical measurements. The wireless device may also autonomously decide to perform more frequent measurement sampling to achieve better measurement performances.

The predefined rule can also be implicit in a sense that sampling is decided by the wireless device itself but it has to meet the predefined requirements. For example it may be predefined that the wireless device shall meet a first set of predefined requirements when performing one or more predefined measurements on signals operating (received and/or transmitted by the wireless device) during the assigned time periods. To achieve this objective, the wireless device may obtain measurement samples of signals related to the measured cell more frequently during the assigned time periods. The implicit rule may also be applicable when there is at least certain number and/or percentage or proportion of the assigned time periods in a cycle during which wireless device can perform measurements e.g. at least 20 ms available time in a cycle of 80 ms.

Non-exhaustive examples of adaptation of measurement sampling are elaborated below. The wireless device may apply one or more of these exemplary examples for one or more measurements performed on the cells belonging to time shared radio spectrum:

The wireless device may adapt the measurement sampling for a measurement performed during the assigned time periods to ensure that the first predefined requirements are met. The first predefined requirements may be more stringent than a second set of predefined requirements. The first predefined requirements may be the same or similar to those which are required to be met by the wireless device when entire radio time is available to the wireless device for performing measurement.

The wireless device may adapt the measurement sampling for a measurement performed during the assigned time periods in order to ensure that at least the second predefined requirements are met. This can ensure that at least the measurement is completed while fulfilling less stringent requirements.

The wireless device may use a reduced number of measurement samples to report final measurement results to the network since measurement can be done only in the assigned time periods. This may result in less stringent requirements compared to the scenario in which the entire time is available for performing a measurement. For example this may lead to longer measurement period and/or less stringent measurement accuracy and/or reduced number of cells for which measurement can be performed over the measurement period.

The wireless device may perform extra measurement sampling during the assigned time periods (i.e. when there is no interruption of signals) in the target cell (aka measured cell) to be measured. For example the wireless device may take a measurement sample on signals transmitted by the network more frequently especially if the assigned time period is smaller than a threshold e.g. smaller than 30 ms. More frequent or dense measurement sampling as disclosed in this example can ensure that the wireless device can meet the requirements which is the same or similar when entire time is available for performing a measurement.

The adaptation of the measurement sampling may be performed by the wireless device depending upon the available the assigned time periods during each cycle and/or the proportion between the assigned time periods and unassigned time periods. For example, if each of the assigned time periods recurs at least every 40-60 ms then the wireless device may not be required to adapt the measurement sampling. Otherwise, the wireless device may obtain more frequent samples i.e. 2-3 measurement samples during each the assigned time period for measuring one cell.

The adaptation of measurement sampling may also be based on the characteristics of a measurement. Examples of measurement characteristics include type of measurements, criticality or urgency level of the measurement, application and use of the measurement, etc. For example, the wireless device may perform more frequent measurement sampling for critical measurements. Examples of critical measurements include RLM, positioning measurements, certain type of positioning measurements which may be used for emergency services or call (e.g. RSTD in LTE, etc). More frequent sampling can ensure that the wireless device can perform measurement over the same duration and with same accuracy when wireless device performs this measurement using legacy approach. In legacy measurement approach entire radio time or at least more radio time is available compared to the case when time sharing of spectrum is used.

The adaptation of measurement sampling may also be based on whether the wireless device is configured to perform a measurement using a measurement pattern or not. Examples of measurement patterns include resource restriction patterns used in a heterogeneous network in LTE. It may be predefined that the wireless device may adapt measurement sampling or measurement procedure for measurements performed using measurement pattern. In another example, it may also be predefined that the adaptation measurement sampling or measurement procedure provided the available restricted subframes in a frame or (or restricted subframe density or average restricted subframe density in a pattern) is below a threshold e.g. less than 2 subframes per frame or less than 10% in a pattern.

The wireless device may adapt one or more signals transmitted in the UL depending upon the available assigned time period. For example, the wireless device may refrain from transmitting signals in the uplink during an unassigned time period in the corresponding BS reception. The wireless device may send uplink reports and/or requests only in the assigned time periods. For example, the wireless device refrain from sending any measurement results (e.g. CSI, RSRP/RSRQ, wireless device Rx-Tx time difference, etc), scheduling requests, and so on to the serving cell during the unassigned time period in the serving BS reception.

The wireless device may also adapt the reporting of feedback information (e.g. CSI reports) and timing of HARQ feedback information such that they are sent in the assigned time periods. The HARQ feedback sent by the wireless device may include ACK (ACKnowledge)/NACK (Negative ACKnowledge) related to the DL data reception e.g. PDSCH reception.

The adaptation may require the wireless device to aggregate or bundle one or more measurements and/or UL signals and/or feedback information and send them together in the UL during the assigned time periods which, may be available either before or after the occurrence of the unassigned time periods.

The wireless device may also aggregate or bundle one or more measurements and/or UL signals and/or feedback information which may be more critical and send them immediately when the assigned time period becomes available. For example, information such as HARQ feedback and CSI reports may be deemed more critical than neighbor cell measurements (e.g. RSRP, RSRQ) and may be sent earlier than the latter.

The wireless device may turn off its radio receiver and/or radio transmitter during one or more unassigned time periods to save its battery life. This means the wireless device need not monitor the control channels, e.g. PDCCH, paging in idle mode, etc. during the unassigned time periods. This is because the wireless device will not be scheduled during such occasions.

The wireless device may perform measurements on non-serving carriers or on other RATs during the unassigned time period. Conventionally, these measurements would require measurement gaps which could result in interruption on the serving cell. However, if they are performed by the wireless device during unassigned time periods, then there may be no interruption on the serving cell and hence data loss on serving cell can be avoided.

The wireless device may also use the unassigned time periods to perform best effort type measurements such as measurements performed in background such as for SON, MDT, etc. The wireless device may further use unassigned time periods to perform measurements which are performed during autonomous gaps e.g. reading of system information (e.g. CGI of a cell).

Using Other Systems During Unassigned Time Periods

The wireless device may use unassigned (e.g. non-allocated) time periods for operating other radio communication systems, i.e. other than the one or those used during the assigned time periods. The wireless device may perform other radio communications during unassigned time periods based on a predefined rule, indication and/or permission received from the network node, and/or based on its own autonomous decision. An advantage of this aspect is that the wireless device can utilize the unassigned time period for other radio communication systems without interrupting or degrading (e.g. due to unwanted emissions) the radio communication performed during the assigned time period.

Examples of other radio communication systems which can operate during unassigned time periods include, but not limited to, multi-RAT operation, in-device operation co-existence operation, and multi-SIM operation. Some of these examples are elaborated below:

The wireless device may also use the unassigned time period(s) for establishing communication over other RATs or over other bands of the same RAT during unassigned time periods. The wireless device can therefore operate over multiple bands and/or RATs without interrupting or losing data on any of the RAT(s)/band(s). The wireless device may operate with multiple RATs during assigned period (e.g. RAT1) and unassigned time period (e.g. RAT2) based on a predefined rule and/or based on explicit indication or permission received from the network node e.g. serving radio node.

An in-device capable wireless device may adapt a radio operational procedure, which enables it to use the unassigned time periods for operating in-device external wireless systems (e.g. WLAN, Bluetooth, etc) and perform cellular operation during the assigned time period. This mechanism may also prevent the in-device co-existence (IDC) interference between RATs if they are used simultaneously but in assigned and unassigned time periods. The wireless device may use the unassigned time periods for external wireless communication based on a predefined rule and/or indication received from the network node or it may even decide to do so autonomously. The wireless device may also use divide the unassigned time periods to use different external wireless systems (e.g. WLAN, Bluetooth, etc). This may also be based on a predefined rule and/or indication received from the network node or autonomous decision by the wireless device itself.

In another aspect, the wireless device may create fewer or even no autonomous gaps (or idle time) for operating the in-device external wireless systems during the assigned time period. The wireless device may also refrain from sending request to the network for assigning of IDC autonomous gaps and/or IDC subframe pattern to enable in-device external wireless systems.

In yet another aspect, the wireless device using external wireless systems during the unassigned time periods may also inform the network node that it is using the unassigned time periods for in-device external wireless system. This can enable the network node to be aware of the utility of unassigned time periods.

A multi-SIM capable wireless device may adapt a radio operational procedure which enables it to split the assigned time periods and unassigned time periods for performing radio communications related to different SIMs, which may be associated with different PLMNs. For example, the wireless device may use the assigned time periods for the radio communication related to the PLMN of an operator which is operating the network (e.g. which assigns resources during the assigned time period, etc). On the other hand, the same wireless device may use the unassigned time periods for performing one or more radio communications related to the other PLMNs supported by one or more of the remaining SIMs.

The radio communication herein refers to any type of procedure related to cellular communication e.g. data reception, data transmission, UL and/or DL radio measurements, reception of paging, sending random access, initiating or terminating a cell/session, sending measurement results, sending or receiving requests related to a radio procedure such as cell change, performing cell update or tracking area update, etc. The wireless device may use the unassigned time periods for operating other SIMs based on a predefined rule and/or indication received from the network node or it may even decide to do so autonomously.

The wireless device may also use divide the unassigned time periods to use different SIMs. This may also be based on a predefined rule and/or indication received from the network node or autonomous decision by the wireless device itself. For example, it may be predefined that the wireless device may use the unassigned time periods for operating other SIMs provided the wireless device has limited or restricted resources and/or certain condition(s) is met or violated; For example, it may use unassigned time periods for operating other SIMs:

If wireless device has a single radio for operating two or more SIM;

If the in-device interference due to multi-SIM operation becomes larger than a threshold;

If the performance (e.g. bit rate, throughput, SINR) due to multi-SIM operation becomes worse than a threshold.

The wireless device can also use the unassigned time period to process the data received during the previous the assigned time period and/or data which the wireless device intends to transmit during the next the assigned time period. The wireless device uses the baseband circuitry for processing the data. Therefore, it can process the data even if it turns off its radio receiver and/or radio transmitter during the unassigned time periods. Most of the battery saving is achieved by turning off the radio receiver and/or radio transmitter.

In this way the overall latency of signal transmission during the assigned time periods can be reduced. This will also reduce the total amount of processing required by the wireless device during the assigned time periods. This will also require the wireless device to implement less amount of hardware e.g. processing unit, memory unit, etc. This in turn may lower cost, reduce complexity, reduce chip area, etc.

The wireless device may adapt the uplink power control operation before and/or after each the unassigned time periods in the serving cell. For example, after the unassigned time periods, the wireless device may operate UL power control in a manner similar to initial power control. More specifically, the wireless device may operate using open loop power control principles after the unassigned time periods. It may also be predefined that the wireless device may run the UL power control similar to initial power control operation provided the unassigned time period is longer than a threshold (e.g. longer than 2-3 frames).

The wireless device may refrain from sending random access to a cell during the unassigned time periods in that cell. The wireless device may also not wait for random access response or monitor random access response during the unassigned time periods.

The wireless device may temporarily stop one or more of the timers over the unassigned time periods in the relevant cell. For example, the wireless device may stop a backoff timer used during the random access procedure when performing random access to a cell. The cell can be the serving cell (e.g. for acquiring UL synchronization, positioning measurement, etc) or it can be a neighbor or any target cell. The neighbor or target cell can be accessed by the wireless device for performing a cell change operation such handover, PCell change, RRC re-establishment, RRC connection release with redirection to target cell, location area update, tracking area update, etc.

Wireless device may also freeze the radio link failure timer (e.g. T310) over the unassigned time period in the serving cell. The timers can be resumed after the signal interruption is over. The network may also indicate as to which of the timers are to be temporarily stopped by the wireless device. There may also be a predefined rule that certain timers (e.g. related to specific procedures) are to be stopped during the unassigned time periods in a cell e.g. in serving cell. It may also be predefined that certain types of timers (e.g. related to specific procedures) are stopped by the wireless device provided the unassigned time periods is larger than certain threshold e.g. more than 30 ms.

The wireless device may perform synchronization to the serving and/or neighboring cells after the unassigned time periods based on predefined rules and/or on explicit signaling. The predefined rule may require that wireless device always apply synchronization to a cell after the occurrence of signal interruption during the unassigned time periods or for certain signal interruption characteristics (e.g when duration of the unassigned time periods is longer than a threshold). This can ensure that wireless device gets synchronized to the cell (especially to the serving cells e.g. PCell and Scell in CA, etc) in case there is change in cell timing after synchronization.

The wireless device may perform synchronization using existing principles such as by correlating signals such as reference signals or synchronization signals transmitted by the cell. In case the network sends the amount of drift in cell timing then the wireless device may adjust its timing according to the received value (e.g. timing advanced command or any other indicator or parameter).

Additional rules and/or requirements may be predefined to govern one or more wireless device procedures e.g. measurement behavior, reporting behavior, etc. The predefined rule may require that wireless device always apply certain procedure(s) after the unassigned time periods or for certain characteristics of the unassigned time periods (e.g. when signal interruption duration during the unassigned time periods is longer than a threshold). Examples of predefined requirements (aka measurement requirements, performance requirements) related to radio measurements include:

cell identification delay, CGI reporting delay, measurement period, measurement reporting delay, measurement reporting time, wireless device transmit timing accuracy, measurement accuracy, evaluation period of out of sync in RLM, evaluation period of in sync in RLM, CSI reporting delay, CSI reporting accuracy, wireless device transmit timing accuracy, etc.

It may be predefined that the one or more of the predefined requirements to be met by the wireless device may be extended or relaxed or allowed to be less stringent when the wireless device is served by and/or measures on cell(s) operating on time shared radio spectrum and/or depending upon the proportion of assigned and the unassigned time periods used for operating on time shared radio spectrum.

For example, it may be predefined that the measurement period over which the wireless device performs measurement may also be extended depending upon whether wireless device operates and/or measures on cells belonging to time shared radio spectrum or not. It may be predefined that a second set of requirements shall be met by the wireless device when served by a cell on a TDM band (i.e. time sharing of radio spectrum) or when performing a measurement on a cell belonging to a TDM band; otherwise the wireless device shall meet the first set of requirements. The second set of requirements may be more relaxed then the first set of requirements. For example, the second set of requirements can be characterized with a longer measurement period than that used in first set of requirements e.g. 400 ms versus 200 ms of measurement period. It may also be predefined that wireless device shall perform only certain measurement (e.g. RLM out of sync and/or in sync, cell identification, etc) while meeting the second set of requirements over the longer measurement period or duration.

In another example, it may be predefined that the measurement period over which the wireless device performs measurement may also be extended depending upon the proportion of assigned and the unassigned time periods. If the assigned time during each occasion and/or rate of occurrence of the assigned time periods are below their respective thresholds (e.g. occurring more than 50 ms), then the wireless device may meet second set of predefined requirements e.g. extended measurement period. For instance, the wireless device may meet the measurement accuracy of RSRP/RSRQ over 400 ms instead of 200 MS.

It may be predefined that due to unavailability of signals (e.g. CRS, synchronization signals, CSI-RS any type of reference signals, etc) during the unassigned time periods, the wireless device is allowed to meet the second set of measurement requirements or adapt the measurement requirements. The wireless device may be allowed to perform certain measurements over longer duration, with relaxed measurement accuracy, etc. The longer duration may be predefined or it may expressed as a function of the signal interruption duration, periodicity, etc. It may be predefined that the wireless device may perform out of sync and in sync evaluations over 250 ms and 200 ms respectively when the signal interruption occurs in serving cell or PCell.

It may be predefined that the wireless device is allowed to meet the second set of measurement requirements or adapt the measurement requirements if the unassigned time period is longer than certain threshold and/or if the periodicity or frequency of the assigned time period is shorter (or the assigned time period is longer than a threshold) and/or periodicity or occurrence of the unassigned time period is more frequent than certain threshold and/or duration of each the assigned time period is short than a threshold. As in previous example, the second set of measurement requirements may correspond to longer measurement duration or evaluation period, etc.

It may be predefined that in general the wireless device is allowed to adjust some of measurement related parameters when there is signal interruption due to unavailability of signals (e.g. CRS, synchronization signals, CSI-RS any type of reference signals, etc) during the unassigned time periods in the cell on which measurement is done. It may also be predefined that in general the wireless device is allowed to adjust some of the measurement related parameters provided the unassigned time period in the cell on which measurement is done is longer than certain duration and/or if the periodicity or frequency of the assigned time period is shorter (or the assigned time period is longer than a threshold) and/or periodicity or occurrence of the unassigned time period is more frequent than certain threshold and/or duration of each the assigned time period is short than a threshold.

The wireless device supporting the inter-frequency and/or inter-RAT measurement in the unassigned time period may be required to meet specific set of predefined requirements. The first set of predefined requirements should be met by the wireless device when it performs such measurements during the assigned time periods. More specifically, a method is disclosed in a wireless device of meeting second set of predefined requirements if the above scenario exists and wireless device supports this capability; otherwise the wireless device should meets the first set of predefined requirements. Examples of predefined requirements as expressed earlier include: measurement accuracy, measurement period over which accuracy is to be met, measurement reporting delay, evaluation periods, cell identification reporting delay, number of cells over which one or more measurement is done over a measurement period, etc.

According to another aspect, one or more second set of predefined requirements may be more stringent than the corresponding first set of predefined requirements. For example, the second set of measurement period may be shorter than the first set of measurement period for the same type of measurement. However some of the requirements may be the same e.g. second set and first set of measurement accuracies may be the same. A shorter second set of measurement period may also depend upon one or more factors such as the type of RATs, type of measurement (e.g. intra-frequency, inter-frequency), the number of cells to measure, etc.

It may be predefined that the wireless device shall meet the predefined requirements for positioning measurements (e.g. OTDOA RSTD) provided sufficient number of positioning related reference signals (e.g. PRS) are available for the wireless device during the assigned time period. It may also be predefined that the wireless device is not required to meet the positioning requirements if all PRS in a PRS occasion are not available in and the assigned time period. It may also be predefined that the wireless device is allowed to meet the second set of predefined requirements (i.e. less stringent requirements compared to first set of requirements) for positioning measurements (e.g. OTDOA RSTD) if all PRS are not available during an the assigned time period.

The wireless device after performing the measurements by taking into account the obtained information related to the time sharing of the spectrum may use the measurement results for one or more radio operational tasks (e.g., RRM tasks). Examples of such tasks include:

Cell selection in low activity state;

Cell reselection in low activity state;

Reporting the result to the network node (e.g. radio node, RNC, eNB, positioning node (e.g. E-SMLC), etc), which may use it for cell change, positioning, network planning, scheduling, link adaptation, setting of transmit power levels, etc.;

Reporting the result to the testing node used for testing or verifying that the wireless device is complaint to or meet one or more predefined procedures, signaling protocols, predefined requirements, etc related to time shared radio spectrum. Examples of such nodes include test equipment node, test system, system simulator, etc. The test system may implement the corresponding procedures and signaling, and may configure wireless device to perform certain procedures in the tests. The test system may receive results from the wireless device, store them, process them, interpret them and determine whether the wireless device is compliant to one or more procedures, signaling protocols and predefined requirements related to time shared radio spectrum or not. This may require the testing node to have memory, processing and control units;

Logging the data and reporting the logged data to the network at specific instant e.g. when collected data exceed a threshold, after logged time period T0, etc. This may be used by the network (e.g. MDT node) for network planning and dimensioning;

For determining user location.

The reported information related to the measurement results may include of identifiers of cells (e.g. PCI, CGI, etc), time period over which the measurement is performed, identifier of operator or their the assigned time period, their carrier frequency, RAT type, results of measurements done on these cells, SFN, ESFN, OSFN, etc. The reported measurement results may be then used by the network for various radio operational tasks e.g. doing handover, positioning a wireless device, network planning, verification or testing of predefined procedures, signaling protocols, and predefined requirements which wireless device has to meet or comply among others.

The wireless device may signal the network node (e.g. serving network node, core network node, measuring node, positioning node, SON node, MDT node, O&M node, OSS node among others) information related to the use of the unassigned time periods by the wireless device for any operation, task and procedure. Examples of operations, tasks or procedures are described in previous sections, but are not limited to those specific examples.

The wireless device may signal information related to on-going operations, operations performed in the past, and/or operations which the wireless device is expected to perform during the unassigned time period. The wireless device may also signal the logged data or statistics of using the unassigned time periods for various other operations or tasks performed in the past e.g. over certain past duration. The wireless device may signal this information to the network node proactively or when it is requested by the network node.

As an example, the wireless device when using external wireless systems during the unassigned time periods may inform the network node that it is currently using the unassigned time periods for in-device external wireless system(s). It may also indicate the type of external wireless system e.g. WLAN. This can enable the network node to be aware of the utility of the unassigned time periods.

The network node upon receiving this information from the wireless device(s) may assess and determine the utility or usefulness of the unassigned time periods and/or of the proportion between assigned and the unassigned time periods. If several wireless devices are observed to frequently use the unassigned time periods for certain operations (e.g. accessing external wireless systems, processing data, etc) the network node may ensure that sufficient unassigned time periods are available in a cell or part of the network where these devices operate. The network node may determine the proportion between the assigned and the unassigned time periods in a cell or in certain part of the network while taking into account at least the information related to the use of the unassigned time periods for different operations by the wireless devices.

The wireless device may indicate or provide relevant capability information to the network node (e.g. radio node, positioning node, relay, etc) to inform whether the wireless device is capable of adapting one or more radio procedures, meeting pre-defined rules and pre-defined requirements described above) when it operates in a frequency band using time sharing principle.

The wireless device capability information sent to the network node may also contain additional or specific information including any one or more of the following:
  Whether the wireless device is capable of adapting one or more radio procedures and/or meeting rules and requirements only in specific when operating in specific time shared radio spectrum or in all time shared radio;
  Whether the wireless device is capable of adapting one or more radio procedures and/or meeting rules and requirements only depending upon the proportion of assigned and unassigned time periods and/or rate of occurrence of the assigned or unassigned time period;
  Whether the wireless device is capable of adapting one or more radio procedures and/or meeting rules and requirements when in D2D communication mode;
  Whether the wireless device is capable of adapting one or more radio procedures and/or meeting rules and requirements only when operating in single carrier mode;
  Whether the wireless device is capable of adapting one or more radio procedures and/or meeting rules and requirements when performed in parallel or nor and number of tasks that can be adapted when performed in parallel;
  Whether the wireless device is capable of signaling the network node (e.g. serving network node, core network node, measuring node, positioning node, SON, MDT, O&M, OSS etc) information related to the use of unassigned time periods by the wireless device for any or for specific operation, task, procedure etc;
  Whether the wireless device is capable of adapting one or more radio procedures and/or meeting rules and requirements when operating in multi-carrier operational mode:
    May also indicate whether it can adapt one or more procedures for UL and/or DL multi-carrier operation;
    May also indicate that it is only capable of adapting one or more radio procedures and/or meeting rules and requirements in certain type of multi-carrier operation e.g. intra-band contiguous CA, inter-band CA, intra-band non-contiguous CA, etc.

The wireless device may send the capability information (i.e., related to the supported scheme) to the network node in one or more of the following manner:
  Proactive reporting without receiving any explicit request from the network node (e.g. serving or any target network node);
  Reporting upon receiving any explicit request from the network node (e.g. serving or any target network node);
  The explicit request can be sent to the wireless device by the network anytime or at any specific occasion. For example the request for the capability reporting can be sent to the wireless device during initial setup or after a cell change (e.g. handover, RRC connection re-establishment, RRC connection release with redirection, PCell change in CA, PCC change in PCC, etc).

In case of proactive reporting, the wireless device may report its capability during one or more of the following occasions:
  During initial setup or call setup e.g. when establishing the RRC connection;
  During cell change e.g. handover, primary carrier change in multi-carrier operation, PCell change in multi-carrier operation, RRC re-establishment, RRC connection release with redirection etc.

The acquired capability information may be used by the network node for performing one or more radio operation tasks or actions. The tasks include selection of a procedure, adapting a parameter in a configuration message related to measurement, scheduling, and mobility. One example of radio operation task is the decision at the network node whether to configure wireless device to perform certain type of measurement or not. For example depending upon the wireless device capability, the network node may select an alternative which is most suitable. If the wireless device supports adaptation of measurement related procedures only in signal carrier operation, then it may configure the wireless device to perform these measurements when wireless device is in single carrier operational mode. The network may limit the number of procedures (e.g. measurements) which the wireless device can adapt when performed in parallel depending upon the wireless device capability.

Nodes Supporting RRM Adaption in Inter-Operator Time Sharing of Shared Spectrum

The methods described above may be implemented at least in network nodes and wireless devices.

Figure 13:
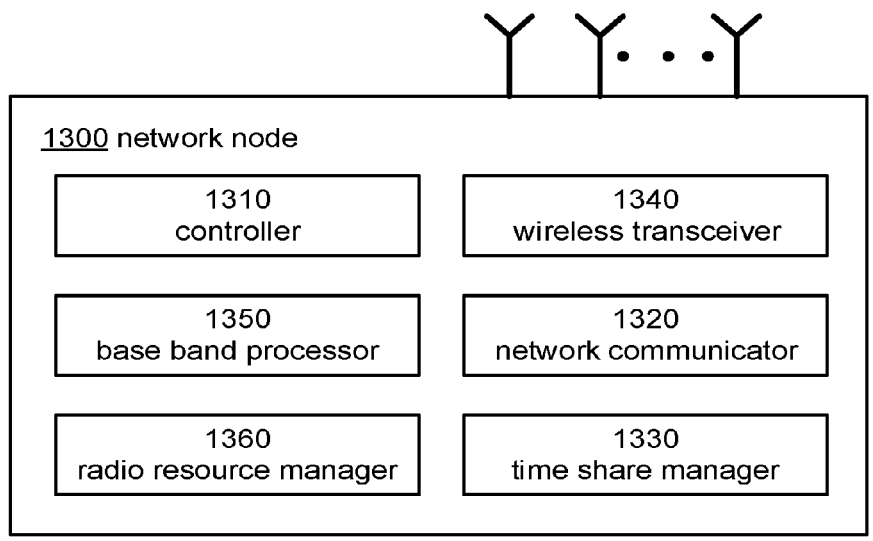
FIG. 13 illustrates an example embodiment of a network node.

FIG. 13 provides an example embodiment of a network node 1300. The network node 1300 may include a controller 1310, a network communicator 1320, and a time share manager 1330. If the network node 1300 is a radio node, the network node 1300 may also include a wireless transceiver 1340, a base band processor 1350, and a radio resource manager 1360.

The wireless transceiver 1340 may be configured to perform radio communications with wireless devices via one or more antennas. The network communicator 1320 may be configured to perform wired and/or wireless communication with other network nodes. It may be configured also to communicate with wireless devices through higher layer signaling via other radio nodes and/or via the wireless transceiver 1340. The base band processor 1350 may be configured to perform base band processing on radio signals received through the wireless transceiver 1340 or on signals prior to being transmitted by the wireless transceiver 1340. The radio resource manager 1360 may be configured to perform radio resource management operations, tasks and procedures, and to adapt one or more radio resource management operations, tasks and procedures as described hereinabove. The radio resource manager 1360 may communicate with other network nodes via the network communicator 1320, and may communicate with wireless devices via either the wireless transceiver 1340 or the network communicator 1340. The controller 1310 may be configured to control the overall operation of the network node 1300. Any of the components may be shared by two or more operators.

FIG. 13 provides a logical view of the network node 1300 and the components included therein. It is not strictly necessary that each component be implemented as physically separate modules. Some or all components may be combined in a physical module.

Figure 14:
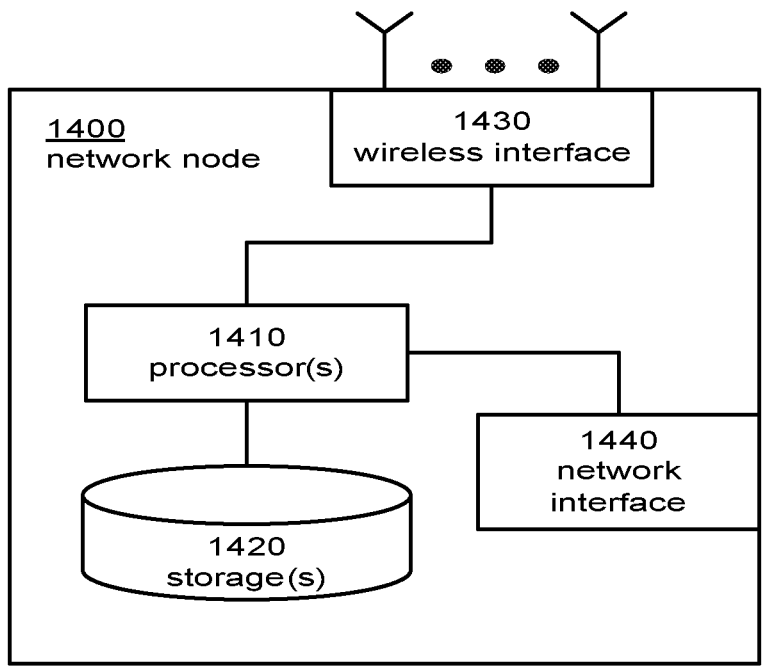
FIG. 14 illustrates another example embodiment of a network node.

Also, the components of the network node need not be implemented strictly in hardware. It is envisioned that the components can be implemented through any combination of hardware and software. For example, as illustrated in FIG. 14, the network node may include one or more hardware processors 1410, one or more storages 1420 (internal, external, both), and one or both of a wireless interface 1430 (in case of a radio node) and a network interface 1440.

The processor(s) 1410 may be configured to execute program instructions to perform the functions of one or more of the network node components. The instructions may be stored in a non-transitory storage medium or in firmware (e.g., ROM, RAM, Flash) (denoted as storage(s) 1420). Note that the program instructions may also be received through wired and/or or wireless transitory medium via one or both of the wireless and network interfaces. The wireless interface 1430 (e.g., a transceiver) may be configured to receive signals from and send signals to other radio nodes via one or more antennas. The network interface 1440 may be included and configured to communicate with other radio and/or network nodes.

To this end, in an example implementation there is provided a network node 1400, e.g. a radio network node. This network node 1400 comprises a wireless interface 1430, one or more processors 1410, and one or more memories 1420. The one or more memories 1420 store(s) computer program code, which, when run in the one or more processors causes the network node 1400 to acquire information relating to an allocation of a same frequency spectrum to each operator of a plurality of operators during different time periods. The same frequency spectrum is shared among the plurality of operators. Furthermore, the wireless interface 1430 is configured to perform and/or adjust a RRM procedure based on the acquired information.

Figure 15:
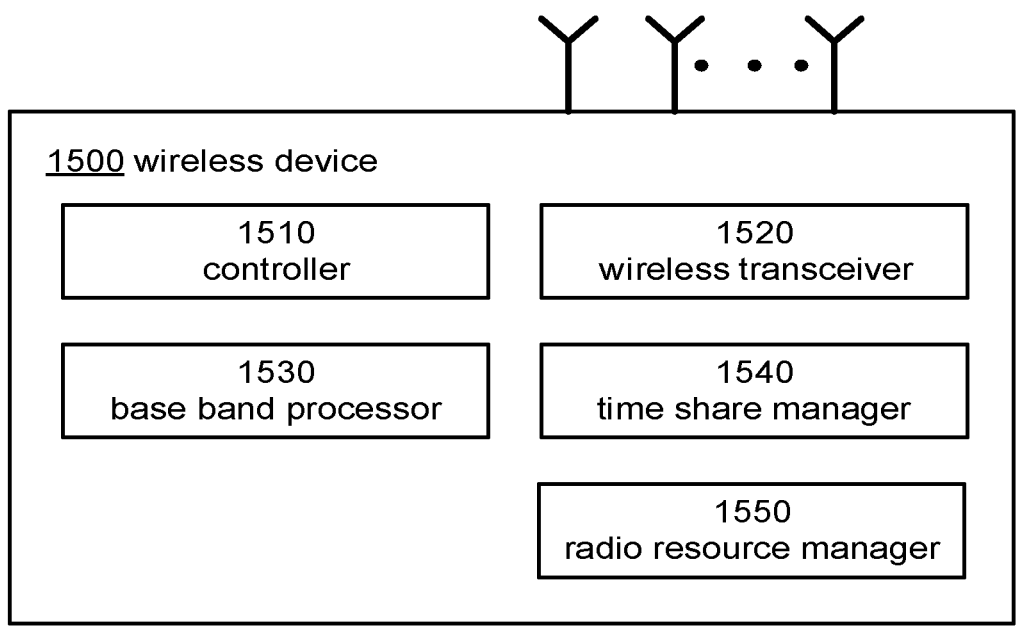
FIG. 15 illustrates an example embodiment of a wireless device.

FIG. 15 shows an example embodiment of a wireless device. The wireless device may include a controller 1510, a wireless transceiver 1520, a base band processor 1530, a time share manager 1540, and a radio resource manager 1550.

The wireless transceiver 1520 may be configured to perform radio communications with radio nodes and/or other wireless devices via one or more antennas. The base band processor 1530 may be configured to perform base band processing on radio signals received through the wireless transceiver 1520 or on signals prior to being transmitted by the wireless transceiver 1520. The time share manager 1540 may be configured to perform methods associated with inter-operator time sharing of shared frequency Fs as related to the wireless device. The radio resource manager 1550 may be configured to perform radio resource management operations, tasks and procedures, and to adapt one or more radio resource management operations, tasks and procedures as described above. The radio resource manager 1550 may communicate with network nodes via the wireless transceiver 1520. The controller 1510 may be configured to control the overall operation of the network node. Any of the components may be shared by two or more operators.

FIG. 15 provides a logical view of the wireless device and the components included therein. It is not strictly necessary that each component be implemented as physically separate modules. Some or all components may be combined in a physical module.

Figure 16:
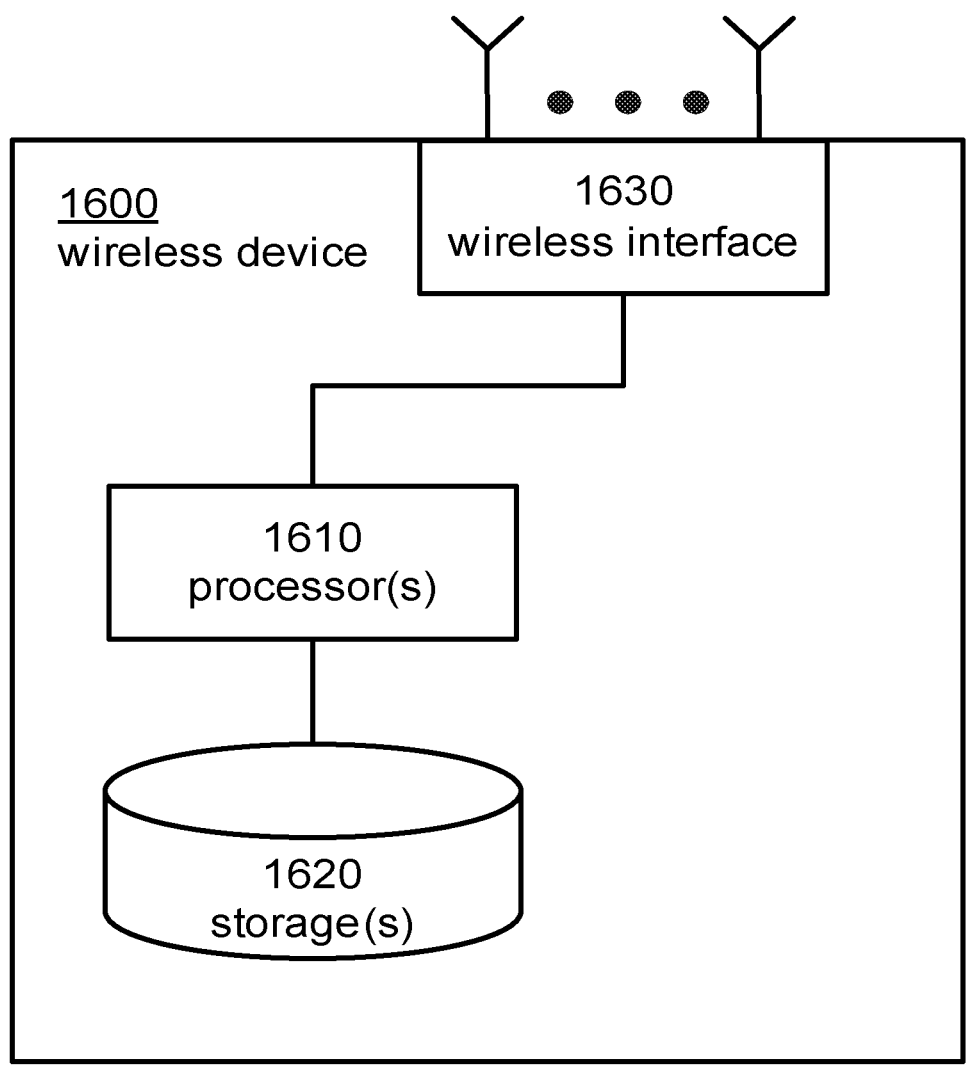
FIG. 16 illustrates another example embodiment of a wireless device.

Also, the components of the wireless device need not be implemented strictly in hardware. It is envisioned that the components can be implemented through any combination of hardware and software. For example, as illustrated in FIG. 16, the wireless device 1600 may include one or more processors 1610, one or more storages 1520 (internal, external, or both), and a wireless interface 1630.

The one or more processors 1610 may be configured to execute program instructions to perform the functions of one or more of the wireless device. The instructions may be stored in a non-transitory storage medium or in firmware (e.g., ROM, RAM, Flash) (denoted as storage(s) 1620). Note that the program instructions may also be received through a transitory medium via the wireless interface. The wireless interface 1630 (e.g., a transceiver) may be configured to receive signals from and send signals to radio nodes and other wireless devices via one or more antennas.

To this end, in an example implementation there is provided a wireless device 1600, e.g. a user equipment (UE). This wireless device 1600 comprises a wireless interface 1630, one or more processors 1610, and one or more memories 1620. The one or more memories 1620 store(s) computer program code, which, when run in the one or more processors causes the wireless device 1600 to acquire information relating to an allocation of a same frequency spectrum to each operator of a plurality of operators during different time periods. The same frequency spectrum is shared among the plurality of operators. Furthermore, the wireless interface 1630 is configured to perform and/or adjust a RRM procedure based on the acquired information.

The wireless device may be shared by two or more operators. For example, portions of the program instructions that cause the hardware components of the wireless device (processors, wireless interface) to perform the functions of the base band processor and/or the time share manager may be shared by two or more operators, i.e., executed on behalf of the sharing operators.

Example Advantages

A non-exhaustive list of advantages of one or more aspects of the disclosed subject matter includes:
- The wireless device and network node can perform measurements while meeting requirements in case of time sharing of the same part of the radio spectrum among operators.
- In particular the radio link monitoring performed by the wireless device will not be misleading; the wireless device will not report out of sync and/or trigger radio link failure due to lack of available signals in the serving cell.
- The measurement failure case, including erroneous event detection, can be avoided due to time sharing of the radio spectrum.
- When there is no signal transmission (i.e. during unassigned time period) the wireless device can perform additional measurements (e.g. on cells on legacy carriers) without requiring measurement gaps.
- The wireless device can save its battery life by going into sleep mode during time periods when wireless device cannot perform measurements or receive data.
- The method also enables radio node power saving. This is because the radio node (e.g. BS) using time shared spectrum can go into sleep mode when the spectrum is used by another operator.
- The method enables the wireless device to use the unassigned time period for other radio communications (e.g. for in-device external wireless systems, multi-SIM operation, other RATs etc) without interrupting or degrading the radio communication performed during the assigned time period by the wireless device.

Abbreviations

3GPP $3^{rd}$ Generation Partnership Project
ABS Almost Blank Subframe
AoA Angle of Arrival
ARFCN Absolute Radio Frequency Channel Number
BSC Base Station Controller
BW Bandwidth
CA Carrier Aggregation
CC Component carrier
CGI Cell Global Identifier
CDMA Code Division Multiple Access
CRS Cell-specific Reference Signal
DB-DC-HSDPA Dual Band-Dual Carrier HSDPA
DCCH Dedicated Control Channel
DL Downlink
DOA Direction Of Arrival
DRX Discontinuous Reception
DTX Discontinuous Transmission
DwPTS Downlink Pilot Time Slot
EARFCN E-UTRA Absolute Radio Frequency Channel Number
EDGE Enhanced Data Rates for GSM Evolution
eNB evolved NodeB
E-SM LC Evolved SM LC
E-UTRAN Evolved UTRAN
FDD Frequency Division Duplex
GERAN GSM EDGE Radio Access Network
GNSS Global Navigation Satellite System
GSM Global System for Mobile Communications
GPRS General Packet Radio Service
HD-FDD Half Duplex FDD
HPN High Power Node (such as a macro base station)
HSDPA High Speed Downlink Packet Access
HSPA High Speed Packet Access
eICIC Enhanced ICIC
ICIC Inter-cell Interference Coordination
IE Information Element
IS In-Sync
IRAT Inter Radio Access Technology
LMU Location Management Unit
LPN Low Power Node (such as a pico base station)
LPP LTE Positioning Protocol
LPPa LTE Positioning Protocol A
LTE Long Term Evolution
MAC Medium Access Control
MBSFN Multicast broadcast single frequency network
MDT Minimization of drive tests
MSR Multi-standard radio
MIB Master Information Block
MIMO Multiple-Input Multiple-Out-put
MTBF Mean time before failure
OSS Operational Support Systems
OFDM Orthogonal Frequency Division Modulation
OFDMA Orthogonal Frequency Division Multiple Access
O&M Operational and Maintenance
OOS Out-of-Sync
OSS Operational Support Systems
PA Power Amplifier
PCI Physical Cell Identifier
PCC Primary component carrier
PCell Primary Cell
PDSCH Physical Downlink Shared Channel
PLMN Public Land Mobile Network
PSC Primary Serving Cell
RAT Radio Access Technology
RIP Received Interference Power
RTT Round Trip Time
RSRP Reference Signal Received Power
RSRQ Reference Signal Received Quality
RN Relay node
RNC Radio Network Controller
RRC Radio Resource Control
RRM Radio Resource Management
RF Radio Frequency
RX Receiver
RRU Radio Unit and Remote Radio Unit
SCC Secondary component carrier
SCell Secondary Cell
SFN Single Frequency Network
SIB System Information Block
SIM Subscriber Identity Module
SINR Signal to Interference and Noise Ratio
SM LC Serving Mobile Location Center
SON Self Organizing Network
SSC Secondary Serving Cell
TA Timing Advance
TAG Timing Advance Group
TDD Time Division Duplex
TD-SCDMA Time Division—Synchronous Code Division Multiple Access
TDD-LTE TDD Long Term Evolution
TS Time Slot
TX Transmitter
UL Uplink
UpPTS Uplink Pilot Time Slot UARFCN UTRA Absolute Radio Frequency Channel Number
UMTS Universal Mobile Telecommunications System
USIM Universal Subscriber Identity Module
UTRA UMTS Terrestrial Radio Access
UTRAN UMTS Terrestrial Radio Access Network
WCDMA Wideband Code Division Multiple Access
X2—an interface for BS-to-BS communication in LTE

REFERENCES

The following references may be relevant to one or more aspects of the subject matter disclosed in this document and are herein incorporated by reference in their entirety:
[1] 3GPP, TS 36.211, "Evolved Universal Terrestrial Radio Access (E-UTRA); Physical Channels and Modulation"
[2] 3GPP TS 25.101, "User Equipment (UE) radio transmission and reception (FDD)"
[3] 3GPP TS 25.104, "Base station (BS) radio transmission and reception (FDD)"
[4] 3GPP TS 25.102, "User Equipment (UE) radio transmission and reception (TDD)"
[5] 3GPP TS 25.105, "Base station (BS) radio transmission and reception (TDD)"
[6] 3GPP TS 36.101, "Evolved Universal Terrestrial Radio Access (E-UTRA) and Evolved Universal Terrestrial Radio Access (E-UTRAN); User Equipment (UE) radio transmission and reception"
[7] 3GPP TS 36.104, "Evolved Universal Terrestrial Radio Access (E-UTRA) and Evolved Universal Terrestrial Radio Access (E-UTRAN); Base station (BS) radio transmission and reception"
[8] 3GPP TS 05.05, "Radio Transmission and Reception"
[9] Co-pending PCT Application PCT/SE2013/050626, "INTER-OPERATOR TIME SHARING OF FREQUENCY SPECTRUM" filed on May 30, 2013.

The invention claimed is:
1. A method performed by a network node, the method comprising:
  acquiring information relating to an allocation of a same frequency spectrum to each operator of a plurality of operators,
    wherein the same frequency spectrum comprises at least two frequency bands and at least one band separating the at least two frequency bands,
    wherein when the allocation is to multiple operators of the plurality of operators during the same time period, the band is a guard band without communication by the multiple operators in the band, and
    wherein when the allocation is exclusively to each operator of the plurality of operators during different time periods, each operator is allocated the entire same frequency spectrum, including the at least one band, for communication during the operator's respective time period; and
  performing a radio resource management (RRM) procedure based on the acquired information.
2. The method of claim 1, wherein performing the RRM procedure based on the acquired information comprises adapting the RRM procedure based on the acquired information.
3. The method of claim 2, wherein the adapting of the RRM procedure is based on acquired information from another node and/or information stored in the network node.

4. The method of claim 2, wherein adapting the RRM procedure comprises:
  adapting frame numbering related parameters;
  adapting measurement configuration parameters;
  adapting scheduling of data;
  adapting measurement requests; and
  adapting random access parameters.
5. The method of claim 2, further comprising transmitting capability information to another network node or to a user equipment, wherein the capability information indicates that the network node is capable of adapting one or more RRM procedures when performing a radio communication during a time period allocated to the network node.
6. The method of claim 2, further comprising receiving capability information from another network node, wherein the capability information indicates that the another network node is capable of adapting one or more RRM procedures when performing a radio communication during a time period allocated to the another network node.
7. The method of claim 2, further comprising receiving capability information from a user equipment, wherein the capability information indicates that the user equipment is capable of adapting one or more RRM procedures when performing a radio communication during a time period allocated to the user equipment.
8. The method of claim 1, wherein the RRM procedure includes one or more of:
  performing a radio measurement;
  turning off a radio transmitter and/or radio receiver during one of a plurality of time periods to save power;
  receiving and/or transmitting data;
  adjusting and signaling a frame number; and
  adapting parameters for enabling operation of another Radio Access Technology (RAT) in-device external wireless system or radio communication related to another SIM during one or plurality of time periods other than time periods during which the network node performs the radio communication.
9. The method of claim 1, wherein the performing the RRM procedure comprises adapting the RRM procedure dependent on one or more characteristics of one or more time periods of the allocated same frequency spectrum.
10. A method performed by a user equipment (UE), the method comprising:
  acquiring information relating to an allocation of a same frequency spectrum to each operator of a plurality of operators,
    wherein the same frequency spectrum comprises at least two frequency bands and at least one band separating the at least two frequency bands,
    wherein when the allocation is to multiple operators of the plurality of operators during the same time period, the band is a guard band without communication by the multiple operators in the band, and
    wherein when the allocation is exclusively to each operator of the plurality of operators during different time periods, each operator is allocated the entire same frequency spectrum, including the at least one band, for communication during its respective time period; and
  performing a radio resource management (RRM) procedure based on the acquired information.
11. The method of claim 10, wherein performing the RRM procedure based on the acquired information comprises adapting the RRM procedure based on the acquired information.

12. The method of claim 11, wherein the adapting the RRM procedure is based on acquired information from a network node and/or information stored in the UE.

13. The method of claim 11:
further comprising adapting one or more RRM procedures; and
wherein adapting one or more RRM procedures comprises one or more of the following:
adapting cell identification;
adapting measurement procedure;
adapting signal transmissions and/or receptions;
adapting power control procedure; and
adapting random access procedure.

14. The method of claim 13, wherein identifying a cell comprises identifying a cell by the allocated frequency spectrum and a cell identifier, wherein the cell identifier is unique during an allocated time period.

15. The method of claim 14, wherein identifying the cell further comprises distinguishing between a plurality of cells operating on the same allocated frequency spectrum but in different time periods.

16. The method of claim 11, further comprising meeting one or more pre-defined requirements depending upon the characteristic of the plurality of during different time periods allocated to different operators for using the same frequency spectrum.

17. The method of claim 16, wherein the meeting one or more pre-defined requirements comprises meeting a first set of pre-defined requirements if a total number of allocated time periods is below a threshold, otherwise meeting a second set of pre-defined requirements, wherein the second pre-defined requirements are more relaxed than the second set of pre-defined requirements.

18. The method of claim 16, wherein meeting one or more pre-defined requirements comprises meeting a first set of pre-defined requirements if a duration of one or plurality of time periods is below a threshold, otherwise meeting a second set of pre-defined requirements, wherein the second pre-defined requirements are more relaxed than the second set of pre-defined requirements.

19. The method of claim 11, further comprising transmitting capability information to a network node or to another user equipment, wherein the capability information indicates that the UE is capable of adapting one or more RRM procedures when performing a radio communication during a time period allocated to the UE.

20. The method of claim 11, further comprising receiving capability information from a network node, wherein the capability information indicates that the network node is capable of adapting one or more RRM procedures when performing a radio communication during a time period allocated to the another network node.

21. The method of claim 11, further comprising receiving capability information from another UE, wherein the capability information indicates that the another UE is capable of adapting one or more RRM procedures when performing a radio communication during a time period allocated to the user equipment.

22. The method of claim 10, wherein the performing the RRM procedure comprises performing the RRM procedure based on the acquired information and meeting one or more pre-defined requirements for the RRM procedure, wherein the pre-defined requirements are dependent upon one or more characteristics of one or more time periods of the allocated same frequency spectrum.

23. A network node, comprising:
a wireless interface;
a processor; and
a non-transitory memory storing computer program code, the computer program code being configured to, when run by the processor, cause the network node to acquire information relating to an allocation of a same frequency spectrum to each operator of a plurality of operators,
wherein the same frequency spectrum comprises at least two frequency bands and at least one band separating the at least two frequency bands,
wherein when the allocation is to multiple operators of the plurality of operators during the same time period, the band is a guard band without communication by the multiple operators in the band, and
wherein when the allocation is exclusively to each operator of the plurality of operators during different time periods, each operator is allocated the entire same frequency spectrum, including the at least one band, for communication during its respective time period; and
wherein the wireless interface is configured to perform a radio resource management (RRM) procedure based on the acquired information.

24. The network node of claim 23, wherein the network node is configured to adapt RRM procedures based on the acquired information.

25. The network node of claim 23, wherein the wireless interface is configured to transmit capability information to another network node or a user equipment, wherein the capability information indicates that the network node is capable of adapting one or more RRM procedures when performing communication during a time period allocated to the network node.

26. The network node of claim 23, wherein the wireless interface is configured to receive capability information from another network node, wherein the capability information indicates that the another network node is capable of adapting one or more RRM procedures when performing a radio communication during a time period allocated to the another network node.

27. The network node of claim 23, wherein the wireless interface is configured to receive capability information from a user equipment, wherein the capability information indicates that the user equipment is capable of adapting one or more RRM procedures when performing a radio communication during a time period allocated to the user equipment.

28. A user equipment (UE) comprising:
a wireless interface;
a processor; and
a non-transitory memory storing computer program code, the computer program code being configured to, when run by the processor, cause the UE to acquire information relating to an allocation of a same frequency spectrum to each operator of a plurality of operators,
wherein the same frequency spectrum comprises at least two frequency bands and at least one band separating the at least two frequency bands,
wherein when the allocation is to multiple operators of the plurality of operators during the same time period, the band is a guard band without communication by the multiple operators in the band, and
wherein when the allocation is exclusively to each operator of the plurality of operators during different time periods, each operator is allocated the entire same frequency spectrum, including the at least one band, for communication during the operator's respective time period;
wherein the wireless interface is configured to perform a radio resource management (RRM) procedure based on the acquired information.

29. The UE of claim 28, wherein the UE is configured to adapt RRM procedures based on the acquired information.

30. The UE of claim 28, wherein the wireless interface is configured to transmit capability information to a network node or another user equipment, wherein the capability information indicates that the UE is capable of adapting one or more RRM procedures when performing communication during a time period allocated to the network node.

31. The UE of claim 28, wherein the wireless interface is configured to receive capability information from a network node, wherein the capability information indicates that the network node is capable of adapting one or more RRM procedures when performing a radio communication during a time period allocated to the another network node.

32. The UE of claim 28, wherein the wireless interface is configured to receive capability information from another user equipment, wherein the capability information indicates that the another user equipment is capable of adapting one or more RRM procedures when performing a radio communication during a time period allocated to the user equipment.

* * * * *